United States Patent
Lyuboshenko

(10) Patent No.: US 12,474,561 B2
(45) Date of Patent: Nov. 18, 2025

(54) AUTOMATIC CORRECTION OF SPHERICAL ABERRATION IN SELECTIVE PLANE ILLUMINATION MICROSCOPY

(71) Applicant: Igor Lyuboshenko, Le Plessis-Robinson (FR)

(72) Inventor: Igor Lyuboshenko, Le Plessis-Robinson (FR)

( * ) Notice: Subject to any disclaimer, the term of this patent is extended or adjusted under 35 U.S.C. 154(b) by 413 days.

(21) Appl. No.: 18/133,470

(22) Filed: Apr. 11, 2023

(65) Prior Publication Data

US 2023/0350180 A1    Nov. 2, 2023

Related U.S. Application Data

(63) Continuation-in-part of application No. 17/977,970, filed on Oct. 31, 2022, now abandoned, which is a
(Continued)

(51) Int. Cl.
*G02B 21/06* (2006.01)
*G01N 21/64* (2006.01)
(Continued)

(52) U.S. Cl.
CPC .......... *G02B 21/06* (2013.01); *G01N 21/6458* (2013.01); *G02B 21/0032* (2013.01);
(Continued)

(58) Field of Classification Search
CPC .............. G02B 21/06; G02B 21/0032; G02B 21/0048; G02B 21/0076; G02B 21/26;
(Continued)

(56) References Cited

U.S. PATENT DOCUMENTS

| 6,259,960 B1 | 7/2001 | Inokuchi |
| 7,554,725 B2 | 6/2009 | Stelzer |

(Continued)

FOREIGN PATENT DOCUMENTS

| EP | 2149064 | 8/2013 |
| EP | 3264153 | 5/2019 |

(Continued)

OTHER PUBLICATIONS

Adams et al. "Light Sheet Fluorescence Microscopy (LSFM) in: "Current Protocols in Cytometry, pp. 12.37.1-12.37.15. Jan. 2015.
(Continued)

*Primary Examiner* — Arnel C Lavarias
(74) *Attorney, Agent, or Firm* — Van Pelt, Yi & James LLP

(57) ABSTRACT

A system including correction and compensation subsystems is disclosed. The correction subsystem is coupled with a detection objective of an optical microscope of a light sheet microscope. The light sheet microscope includes an illumination source, optical elements, and the detection objective in a detection path of the optical microscope. The illumination source emits light that travels along an illumination path to illuminate a microscopy specimen in the detection path. The optical elements are in the illumination path and at least in part transform the light into a light sheet illuminating the microscopy specimen. The correction subsystem is configured to provide a correction of a spherical aberration using the detection objective. The compensation subsystem is coupled with the correction subsystem and configured to adjust a position of a waist of the light sheet based on the correction, adjust a position of a focus of the detection objective to coincide with the position of the waist based on the correction, or both.

19 Claims, 21 Drawing Sheets

Related U.S. Application Data continuation of application No. 16/923,783, filed on Jul. 8, 2020, now Pat. No. 11,513,329, which is a continuation of application No. 15/944,485, filed on Apr. 3, 2018, now Pat. No. 10,768,400, which is a continuation-in-part of application No. 15/680,075, filed on Aug. 17, 2017, now Pat. No. 10,365,464.

(60) Provisional application No. 63/330,165, filed on Apr. 12, 2022, provisional application No. 62/556,093, filed on Sep. 8, 2017, provisional application No. 62/489,168, filed on Apr. 24, 2017.

(51) Int. Cl.
  *G02B 21/00* (2006.01)
  *G02B 21/26* (2006.01)

(52) U.S. Cl.
  CPC ..... *G02B 21/0048* (2013.01); *G02B 21/0076* (2013.01); *G02B 21/26* (2013.01)

(58) Field of Classification Search
  CPC .. G02B 21/00; G02B 21/0004; G02B 21/002; G02B 21/0036; G02B 21/0052; G02B 21/006; G02B 21/0072; G02B 21/36; G02B 21/361; G01N 21/6458; G01N 21/6456; G01N 2021/6463
  USPC ....... 359/385, 362, 363, 368, 369, 388, 390, 359/432, 434
  See application file for complete search history.

(56) References Cited

U.S. PATENT DOCUMENTS

| | | |
|---|---|---|
| 7,787,179 B2 | 8/2010 | Lippert |
| 8,482,854 B2 | 7/2013 | Lippert |
| 8,699,133 B2 | 4/2014 | Lippert |
| RE45,575 E | 6/2015 | Lippert |
| 9,316,824 B2 | 4/2016 | Shroff |
| 9,404,869 B2 | 8/2016 | Keller |
| 9,411,142 B2 | 8/2016 | Ue |
| 9,423,601 B2 | 8/2016 | Toda |
| 9,587,213 B2 | 3/2017 | Morgan |
| 10,007,100 B2 | 6/2018 | Kikuchi |
| 10,379,329 B2 | 8/2019 | Ue |
| 10,739,266 B2 | 8/2020 | Keller |
| 10,746,981 B2 | 8/2020 | Tomer |
| 11,156,822 B2 | 10/2021 | Lyuboshenko |
| 11,933,972 B2* | 3/2024 | Lotter .................. G02B 21/025 |
| 2007/0176103 A1 | 8/2007 | Inada |
| 2012/0282667 A1 | 11/2012 | Lippert |
| 2014/0202265 A1 | 7/2014 | Hellmich |
| 2015/0098126 A1 | 4/2015 | Keller |
| 2016/0124201 A1 | 5/2016 | Kikuchi |
| 2016/0214107 A1 | 7/2016 | Viasnoff |
| 2016/0241758 A1 | 8/2016 | Dohi |
| 2016/0306154 A1 | 10/2016 | Iguchi |
| 2017/0038575 A1* | 2/2017 | Pretorius ............ G02B 27/0025 |
| 2017/0261731 A1 | 9/2017 | Shimada |
| 2018/0031816 A1* | 2/2018 | Shimada ............... G02B 21/367 |
| 2018/0164569 A1 | 6/2018 | Brinkman |
| 2018/0180867 A1 | 6/2018 | Shimada |
| 2018/0275389 A1 | 9/2018 | Shepherd |
| 2018/0314047 A1* | 11/2018 | Shimada ............ G02B 21/0076 |
| 2019/0302439 A1 | 10/2019 | Lyuboshenko |

FOREIGN PATENT DOCUMENTS

| | | |
|---|---|---|
| WO | 2014056992 | 4/2014 |
| WO | WO2016166151 | 10/2016 |
| WO | 20160178856 | 11/2016 |
| WO | 2017062741 | 4/2017 |
| WO | WO2018033581 | 2/2018 |

OTHER PUBLICATIONS

Chhetri et al: "Whole-animal functional and developmental imaging with isotropic spatial resolution", Nature Methods. vol. 12. No. 12. Dec. 1, 2015 (Dec. 1, 2015). pp. 1171-1178. XP055611986. New York, ISSN: 1548-7091. DOI: 10.1038/nmeth.3632.

Chmielewski et al., "Fast imaging of live organisms with sculpted light sheets", Scientific Reports, Apr. 20, 2015.

De Medeiros et al: "Confocal multiview light-sheet microscopy", Nature Communications, vol •0 6. No. 1. Nov. 25, 2015 (Nov. 25, 2015). XP055587306. DOI: 10.1038/ncomms9881, p. 4.

Dean et al., Deconvolution-Free Subcellular Imaging with Axially Swept Light Sheet Microscopy, Biophysical Journal, vol. 108, Jun. 2015, pp. 2807-2815.

Dean et al., Diagonally Scanned Light-Sheet Microscopy for Fast Volumetric Imaging of Adherent Cells, Biophysical Journal 110, Biophysical Society, Mar. 29, 2016, pp. 1456-1465.

Dean et al., Uniform and Scalable Light-Sheets Generated by Extended Focusing, Department of Cell Biology, University of Texas Southwestern Medicate Center, Optics Express, vol. 22, No. 21, Oct. 16, 2014.

Fahrbach et al., "Rapid 3D light-sheet microscopy with a tunable lens", Optics Express, vol. 21, No. 18, p. 21010-21026, Aug. 30, 2013.

Hedde et al., "sideSPIM—selective plane illumination based on a conventional inverted microscope", from Biomedical Optics Express, vol. 8, No. 9, p. 3918-3937, Aug. 1, 2017

Hedde et al., Selective Plane Illumination Microscopy with a Light Sheet of Uniform Thickness Formed by an Electrically Tunable Lens, Microscopy Research and Technique, Jun. 24, 2016.

Huisken et al: "Even fluorescence excitation by multidirectional selective plane illumination microscopy (mSPIM)" Optics letters, Optical Society of America, vol. 32, No. 17, Sep. 1, 2007.

Jan Huisken et al., "Selective Plane Illumination Microscopy", In: "Handbook of Biological Confocal Microscopy", Jan. 1, 2006, Springer, New York, NY. pp. 672-675.

Koho et al., Image Quality Ranking Method for Microscopy, Scientific Reports, Jul. 1, 2016.

Power et al: "A guide to light-sheet fluorescence microscopy for multiscale imaging", Nature Methods, vol. 14, No. 4, Apr. 1, 2017 (Apr. 1, 2017), pp. 360-373, XP055536560, New York, ISSN: 1548-7091, DOI: 18.1038/nmeth.4224, p. 367.

Sarah Lukes, "Dynamic and Agile Focusing in Microscopy: A Review" in: "Dynamic and Agile Focusing in Microscopy: A Review", Jan. 1, 2016.

Yang et al: "Dual-slit confocal light sheet microscopy for in vivo whole-brain imaging of zebrafish", Biomedical Optics Express, vol. 6, No. 5, May 1, 2015 (May 1, 2015), p. 1797, XP055514896, United States, SSN: 2156-7085, DOI: 10.1364/BOE.6.001797.

Yl et al., "Light-sheet fluorescence imaging to localize cardiac lineage and protein distribution", Scientific Reports, vol. 7, No. 1, Mar. 1, 2017.

Zeiss, Zeiss Lightsheet 7, Light Sheet Fluorescence Microscopy for Multiview Imaging of Living and Cleared Specimans, Feb. 2020, pp. 1-4.

Zong et al., Large-field high-resolution two-photon digital scanned light-sheet microscopy, Cell Research, vol. 25, No. 2, Sep. 26, 2014, pp. 254-257.

* cited by examiner

SECTION A-A

SECTION C-C

AUTOMATIC CORRECTION OF SPHERICAL ABERRATION IN SELECTIVE PLANE ILLUMINATION MICROSCOPY

CROSS REFERENCE TO OTHER APPLICATIONS

This application claims priority to U.S. Provisional Patent Application No. 63/330,165 entitled AUTOMATIC CORRECTION OF SPHERICAL ABERRATION IN SELECTIVE PLANE ILLUMINATION MICROSCOPY filed Apr. 12, 2022 which is incorporated herein by reference for all purposes.

This application is a continuation in part of U.S. patent application Ser. No. 17/977,970 entitled VARYING AN ILLUMINATION PATH OF A SELECTIVE PLANE ILLUMINATION MICROSCOPY filed Oct. 31, 2022, which is a continuation of U.S. patent application Ser. No. 16/923,783, now U.S. Pat. No. 11,513,329, entitled VARYING AN ILLUMINATION PATH OF A SELECTIVE PLANE ILLUMINATION MICROSCOPY filed Jul. 8, 2020, which is a continuation of U.S. patent Ser. No. 15/944,485, now U.S. Pat. No. 10,768,400, entitled VARYING AN ILLUMINATION PATH OF A SELECTIVE PLANE ILLUMINATION MICROSCOPY filed Apr. 3, 2018, which claims priority to U.S. Provisional Patent Application No. 62/556,093 entitled OPTICAL ARRANGEMENT TO EXTEND OPTICAL MICROSCOPES TO PROVIDE 3D SELECTIVE PLANE ILLUMINATION MICROSCOPY filed Sep. 8, 2017, all of which are incorporated herein by reference for all purposes.

U.S. patent application Ser. No. 15/944,485, now U.S. Pat. No. 10,768,400, is a continuation in part of U.S. patent application Ser. No. 15/680,075, now U.S. Pat. No. 10,365,464, entitled EXTENDING OPTICAL MICROSCOPES TO PROVIDE SELECTIVE PLANE ILLUMINATION MICROSCOPY filed Aug. 17, 2017, which claims priority to U.S. Provisional Patent Application No. 62/489,168 entitled EXTENDING OPTICAL MICROSCOPES TO PROVIDE SELECTIVE PLANE ILLUMINATION MICROSCOPY filed Apr. 24, 2017, both of which are incorporated herein by reference for all purposes.

BACKGROUND OF THE INVENTION

Light sheet fluorescence microscopy or selective plane illumination microscopy (SPIM) technology typically relies on illuminating of a specimen in thin optical slices, formed from laser light, exciting the fluorophores in the specimen and acquiring light emitted by the illuminated plane inside the specimen. The direction in which the light is detected is typically perpendicular to the illuminated plane. The resolution of SPIM is often limited by the shape and properties of the light sheet illuminating the specimen. Further, properties of the specimen and solution in which the specimen resides may also affect the ability of the SPIM to accurately image the microscopy specimen. For example, high resolution visualization of fixed specimens, living organisms, and cells in SPIM may be obtained using a digital camera coupled with a microscope, illumination units having high numerical aperture (NA) detection objectives, and a laser light sheet system. The high-NA detection objectives may be used in conjunction with various clearing and imaging solutions in which biological samples are embedded. Refractive indices of some typical clearing and imaging solutions can vary by a significant amount, for example approximately fifteen percent, with respect to the refractive index of water (1.33). A slight mismatch between the refractive index for which the objective is designed and the actual refractive index of the clearing and imaging solution gives rise to a spherical aberration in the detected fluorescent light. The spherical aberration dramatically degrades the optical quality of SPIM images. The spherical aberration arises when fluorescent light rays are collected in different focal planes by central and peripheral areas of the detection objectives. The spherical aberration is most notable when using the high-NA objectives as they feature a large-area front lens. Consequently, a mechanism for improving imaging using SPIM for spherical aberration induced by, for example, microscopy specimens, is desired.

BRIEF DESCRIPTION OF THE DRAWINGS

Various embodiments of the invention are disclosed in the following detailed description and the accompanying drawings.

DETAILED DESCRIPTION

Figure 1A:
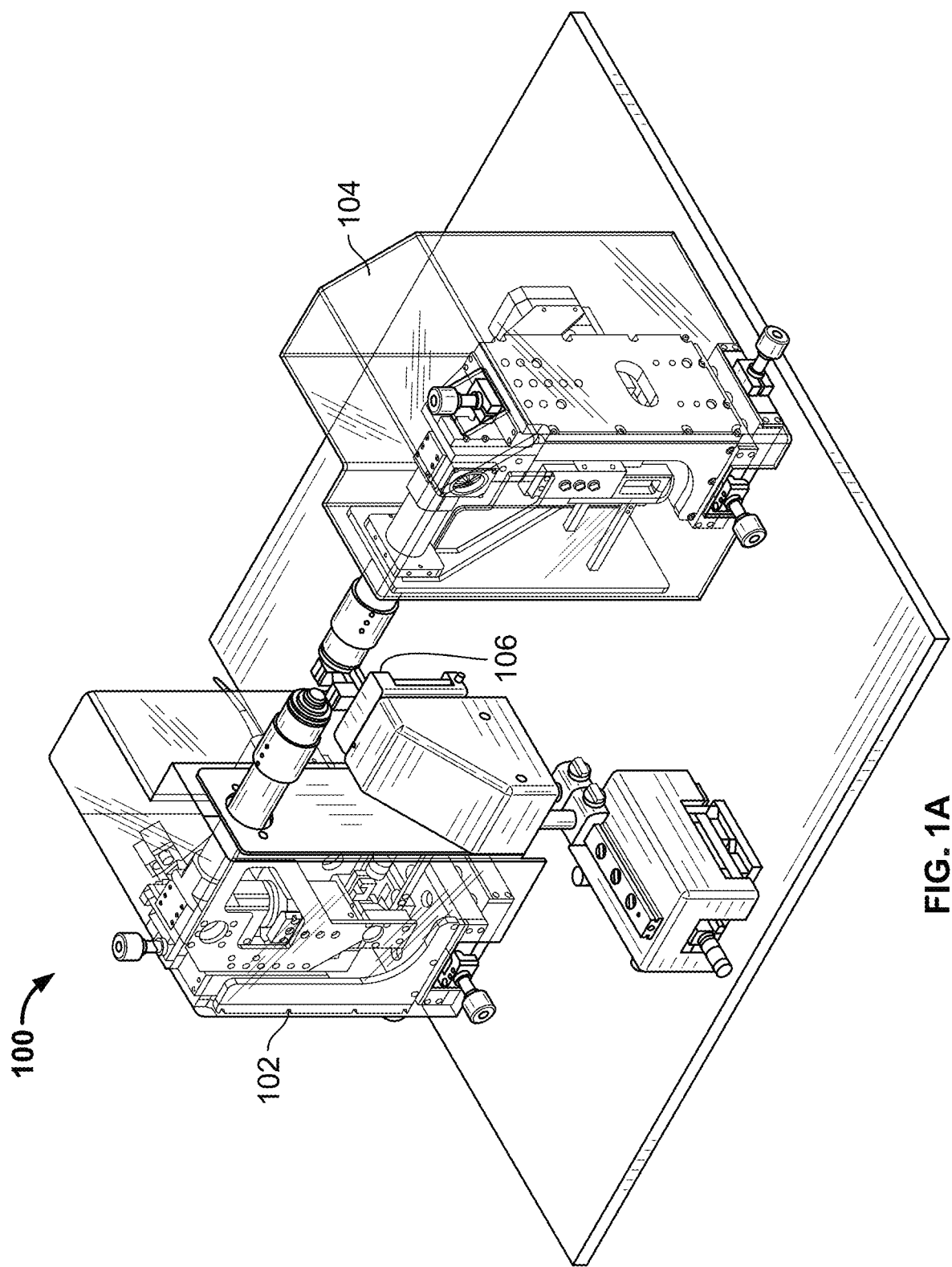
FIG. 1A is a diagram illustrating an embodiment of components of a system that can be coupled to a microscope to convert the microscope to perform SPIM.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task.

As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Light sheet fluorescence microscopy or selective plane illumination microscopy (SPIM) may be used in imaging a variety of microscopy specimens. However, properties of the specimen and solution in which the specimen resides may also affect the ability of the SPIM to accurately image the microscopy specimen. For example, high-numerical aperture (NA) detection objectives may be used in conjunction with various clearing and imaging solutions that have varying refractive indices. A slight mismatch between the refractive index for which the lens of the objective is designed and the actual refractive index of the clearing and imaging solution gives rise to a spherical aberration in the detected fluorescent light. Issues due to spherical aberration may be exacerbated for high-NA detection objectives. Consequently, a mechanism for addressing spherical aberrations in the context of SPIM is desired.

A system including a correction subsystem and a compensation subsystem is disclosed. The correction subsystem is coupled with a detection objective of an optical microscope of a light sheet microscope. The light sheet microscope includes an illumination source, optical elements, and the detection objective in an optical detection path of the optical microscope. The illumination source is configured to emit a light that travels along an illumination path to illuminate a microscopy specimen placed in the optical detection path of the optical microscope. The optical elements are in the illumination path and are configured to at least in part transform the light from the illumination source into a light sheet illuminating the microscopy specimen. The light sheet is movable through at least a portion of the microscopy specimen. The correction subsystem is configured to provide a correction of a spherical aberration using the detection objective. The compensation subsystem is coupled with the correction subsystem and configured to adjust a position a waist of the light sheet based on the correction.

FIGS. 1A-6E depict an embodiment of a SPIM usable in connection with the correction system described herein. FIG. 1A is a diagram illustrating an embodiment of components of a system that can be coupled to a microscope to convert the microscope to perform SPIM. System 100 includes illumination units 102 and 104, and stepper stage 106.

Illumination units 102 and 104 are designed to work with a laser source (e.g., fiber laser source) to produce a light sheet using a cylindrical lens. This allows direct imaging of an optical section with a single frame at full camera resolution. For better illumination plane homogeneity across the specimen, two illumination units are used on both sides of a specimen to compensate the absorption effects with a thick specimen. In some embodiments, the light sheet is projected using an objective, which can be adapted according to specimen size and detection magnification. The illumination units are designed to compensate chromatic shift for the visible spectrum, thus allowing the simultaneous illumination at several wavelengths using a laser combiner for multi-fluorescence imaging. Although two illumination units are shown, a single or any other number of illumination units may be utilized in various other embodiments. In some embodiments, illumination units 102 and/or 104 produce a pencil beam rather than or in addition to a light sheet.

Optical arrangements of illumination units 102 and/or 104 provide illumination for a three-dimensional selective plane light-sheet microscopy. In some embodiments, these optical arrangements can dynamically vary: a cross section of a light sheet, a position of a waist of the light sheet along an axis of illumination, a position of the plane of the light sheet illumination, and/or a direction in which beam components extending within the light sheet are directed to the specimen.

Stepper stage 106 includes a motorized translation stage to move the specimen through the illumination plane of illumination units 102 and 104. Thus, using stepper stage 106, the illumination sheet and the detection plane may remain in fixed positions while detecting various slices as the translation stage is moved in steps. The shown stepper stage 106 includes a support for a specimen chamber, a z-stage that is moveable in the vertical z-direction via a motor, a slider, and controls for x and y position adjustments of the stage in the horizontal plane. In some embodiments, a base configured to engage a specimen stage for supporting and orienting the specimen holder in an x-y direction is utilized. In some embodiments, a translational stage configured to engage the specimen holder in the z-direction is utilized.

Figure 1B:
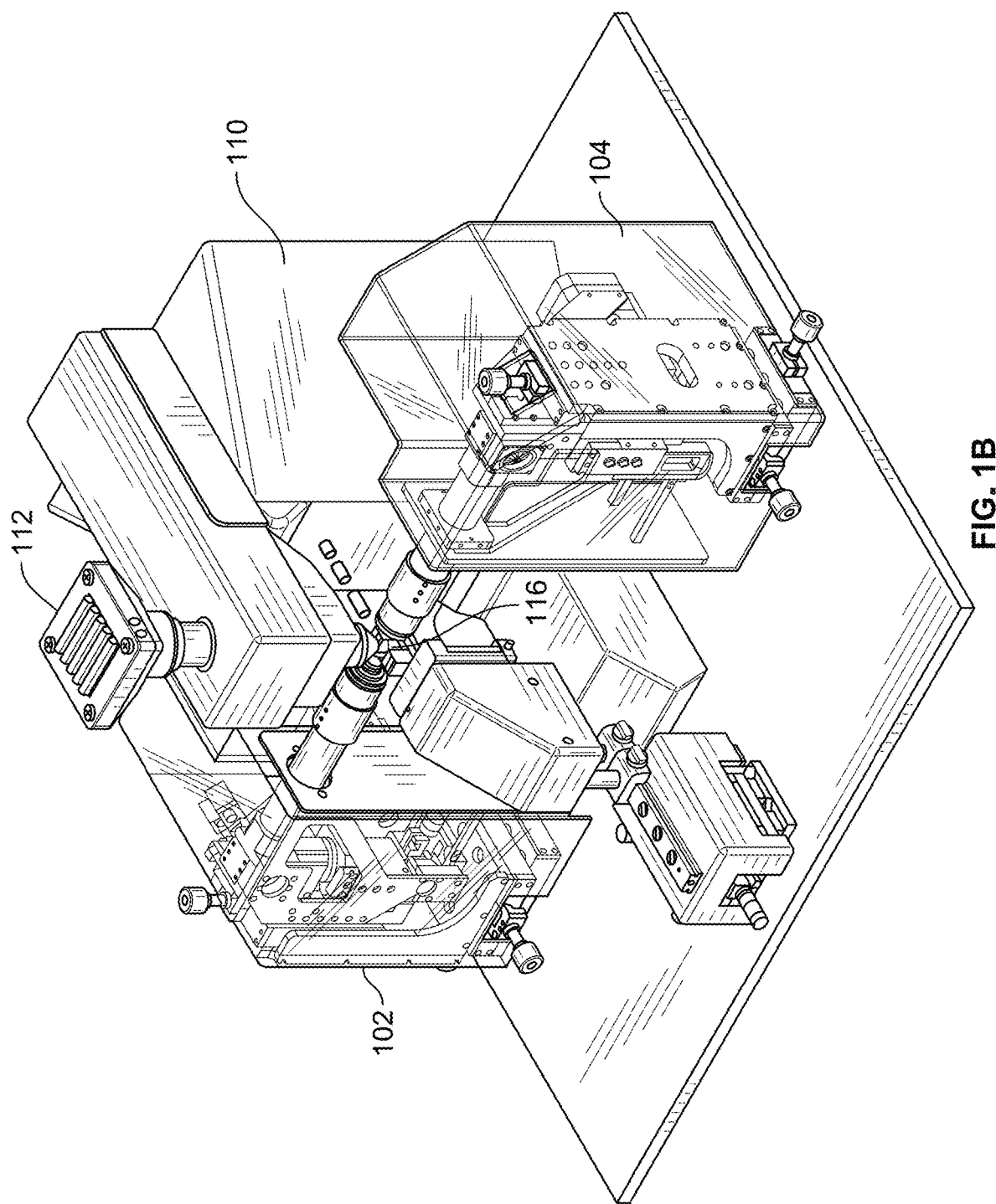
FIG. 1B is a diagram illustrating an embodiment showing an add-on system added to a vertical microscope to convert the vertical microscope to perform SPIM.

FIG. 1B is a diagram illustrating an embodiment showing an add-on system added to a vertical microscope to convert the vertical microscope to perform SPIM. For example, system 100 of FIG. 1A is shown engaged with vertical optical microscope 110. Vertical optical microscope 110 shown in this example is a trinocular fluorescence microscope equipped with a filter wheel and an objective turret with a water dipping/immersion detection lens. However in various other embodiments, other types of optical microscopes may be utilized. The optical detection path utilized to perform SPIM may utilize standard components of microscope 110, including its components in the optical detection path (e.g., objective lenses, arm, filter in filter wheel, etc.). An output port of optical microscope 110 is coupled to detection unit 112 that is utilized to acquire the SPIM image detected using the optical detection path of microscope 110. For example, detection unit 112 includes a digital camera. In some embodiments, a focus distance of the optical detection path can be dynamically varied and synchronized with the dynamic variance of the light sheet illumination to increase the resolution of a detected image of the SPIM specimen.

Specimen chamber and holder assembly 116 has been configured to handle SPIM using a vertical optical detection path configuration as compared to traditional holders that have been designed to be utilized for horizontal optical SPIM detection paths. Specimen chamber and holder assembly 116 allows a specimen to be rotated about a substantially horizontal rotational axis and substantially perpendicular to the optical axis of the detection objective using a rotational drive or knob. For example, specimen chamber and holder assembly 116 embeds a specimen in a substantially rigid substantially transparent embedding compound maintained in an immersion liquid and placed in the holder, allowing the specimen to be rotated about the substantially horizontal rotational axis that is substantially perpendicular to the optical axis of the detection objective. In some embodiments, specimen chamber and holder assembly 116 is supported by a specimen stage for supporting and orienting assembly 116 in an x-y direction and/or a translational stage configured to engage the assembly 116 in the z-direction.

Figure 2:
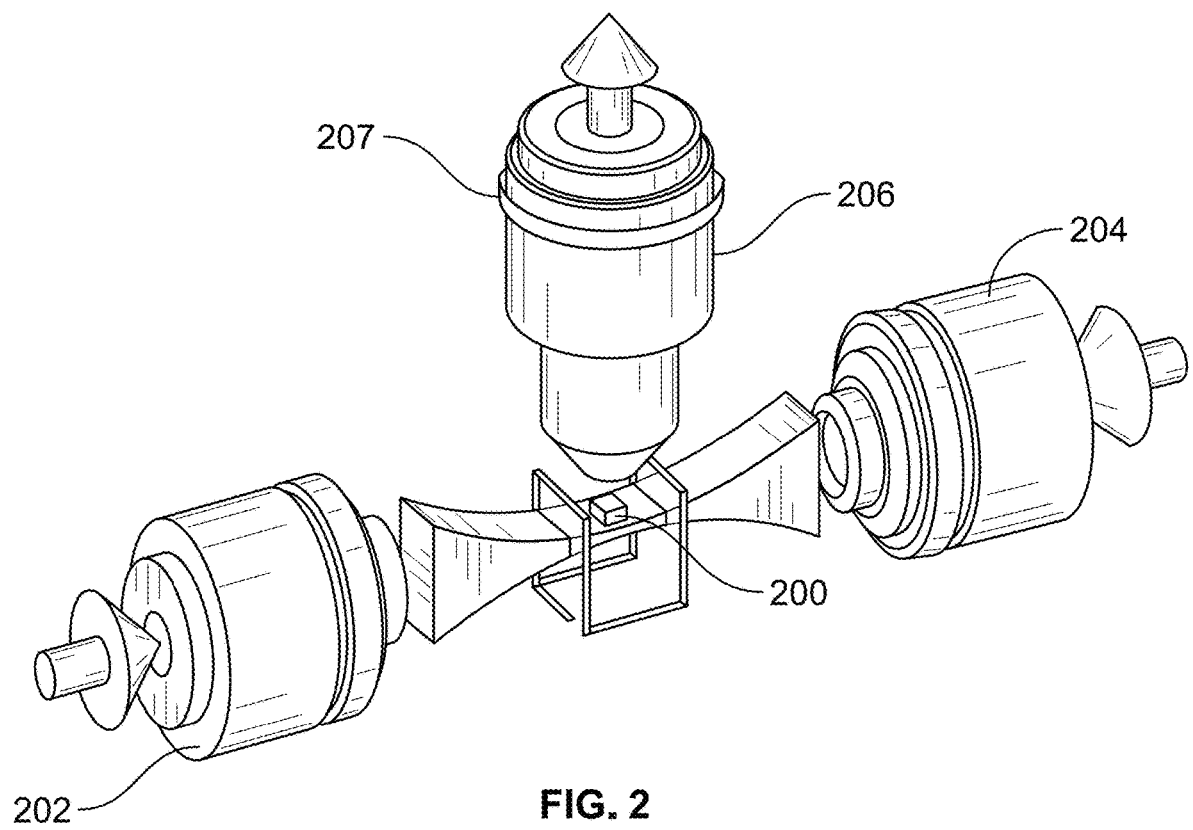
FIG. 2 is a diagram illustrating an example of illumination of a specimen.

FIG. 2 is a diagram illustrating an example of illumination of a specimen usable with a system and method for correcting spherical aberration. In some embodiments, a light-sheet microscopy system uses a standard upright or inverted microscope, capable of illuminating a set of planes within a specimen, to detect the fluorescent emission coming from the illuminated plane, while at the same time producing the finest axial resolution at the largest region of interest. Specimen 200 is being illuminated by illumination objective 202 and illumination objective 204. The illuminated specimen is observed via optical detection objective 206. In some embodiments, detection objective 206 is a part of microscope 110, illumination objective 202 is a part of illumination unit 102, and illumination objective 204 is a part of illumination unit 104 of system 100 of FIGS. 1A and 1B. Also shown is spherical aberration correction collar 207, which may be considered part of microscope 110 and/or a system and method for correcting spherical aberration. For example, the illumination units are designed to work with fibered laser sources to produce a light sheet using cylindrical lenses of the objectives. This allows direct imaging of an optical section with a single frame at full camera resolution. For better illumination plane homogeneity across the specimen, two illumination units are used on both sides of the specimen to compensate for the absorption effects of a thick specimen sample. In an alternative embodiment, a single illumination unit is utilized. In some embodiments, the light sheet is projected using finite-infinite objectives, which can be adapted according to specimen size and detection magnification. In some embodiments, the illumination output of the objectives has a cross section of an elongated ellipse due to an assembly of optical elements in which the thin sheet of light is generated from one or many laser light sources. In another embodiment, the illumination output of the objectives has a cross section of an elongated rectangle. Lenses of objectives 202 and 204 are designed to optically compensate chromatic shift for the visible spectrum, thus allowing the simultaneous illumination at several wavelengths using a laser combiner for multi-fluorescence imaging.

Illumination objectives 202 and 204 focus the laser light source to create a light sheet. However, as shown in FIG. 2, due to the focusing of the light source by the lens of the objective, the light sheet is thinner at the focal point area (i.e., at the "waist") and becomes thicker away from the focal point area. A thinner light sheet allows for better image resolution and thus a uniformly thin light sheet is desired. Given the effects of the shown divergence, a light sheet within a limited range of thickness can be utilized in order to maintain a desired image resolution, thus limiting the field of view to the area of the light sheet within the thickness limit. However in some cases it may be desirable to capture a specimen that is larger than the limited field of view. In some embodiments, a variable focus lens is utilized in illumination units to sweep the focal point across the specimen to create a thinner light sheet over a larger area of the light sheet. For example, focus distance of the illumination is automatically adjusted to move and sweep the focus across the specimen during image capture to automatically sweep the thinnest point of the light sheet across the specimen. By using a lens of variable focal distance in the illumination path of the optical arrangement, sweeping of the light sheet waist is made possible along the illumination direction. The lens of variable focal distance can vary between both negative and positive optical powers. This allows the acquisition of light sheet images of both the finest axial resolution and the largest field of view in one and the same frame.

By synchronizing lines of a rolling shutter of a detector (e.g., digital camera) with the sweeping position of the waist of the light sheet, a detected image of the specimen with a larger field of view can be generated without physically moving the specimen within the plane of the light sheet. The focus distance of the illumination may be adjusted electronically and/or mechanically. For example, rather than relying on the mechanical motor mechanism that may introduce vibrations, the focal distance of an electronically tunable lens may be changed electrically (e.g., via electromagnets, piezoelectric element, current through a solution, etc.) without a use of a motor.

In some embodiments, a lens of variable focal distance is utilized in the detection path of the microscope. This optical device, allowing for fast remote focusing, is inserted into the detection path between the microscope's video output port and the digital camera, or between the microscope's detection objective and the microscope's tube lens. The specimen, in its chamber, is set in a fixed position when the illumination plane and the detection plane move simultaneously through the specimen. As the specimen remains in a steady position, vibrations and perturbation issues are alleviated. Incidentally specimen mounting and holding becomes much easier. Three dimensional acquisition can be achieved at camera frame rate without being limited by mechanical constraints (e.g., 100 fps at 4 Mpixels using a sensitive sCMOS camera).

In some embodiments, if required, a means for influencing the light sheet direction is utilized. Together with the sweeping of the light sheet waist, this means helps reduce or remove altogether shadows occurring within the observed specimen's plane. By integrating these scanning means, the light sheet system not only provides optical sectioning with optimal spatial resolution and signal to noise ratio, but also delivers unprecedented temporal resolution for 3D acquisition, addressing the needs for dynamic imaging of rapid biophysical processes.

Figure 3A:
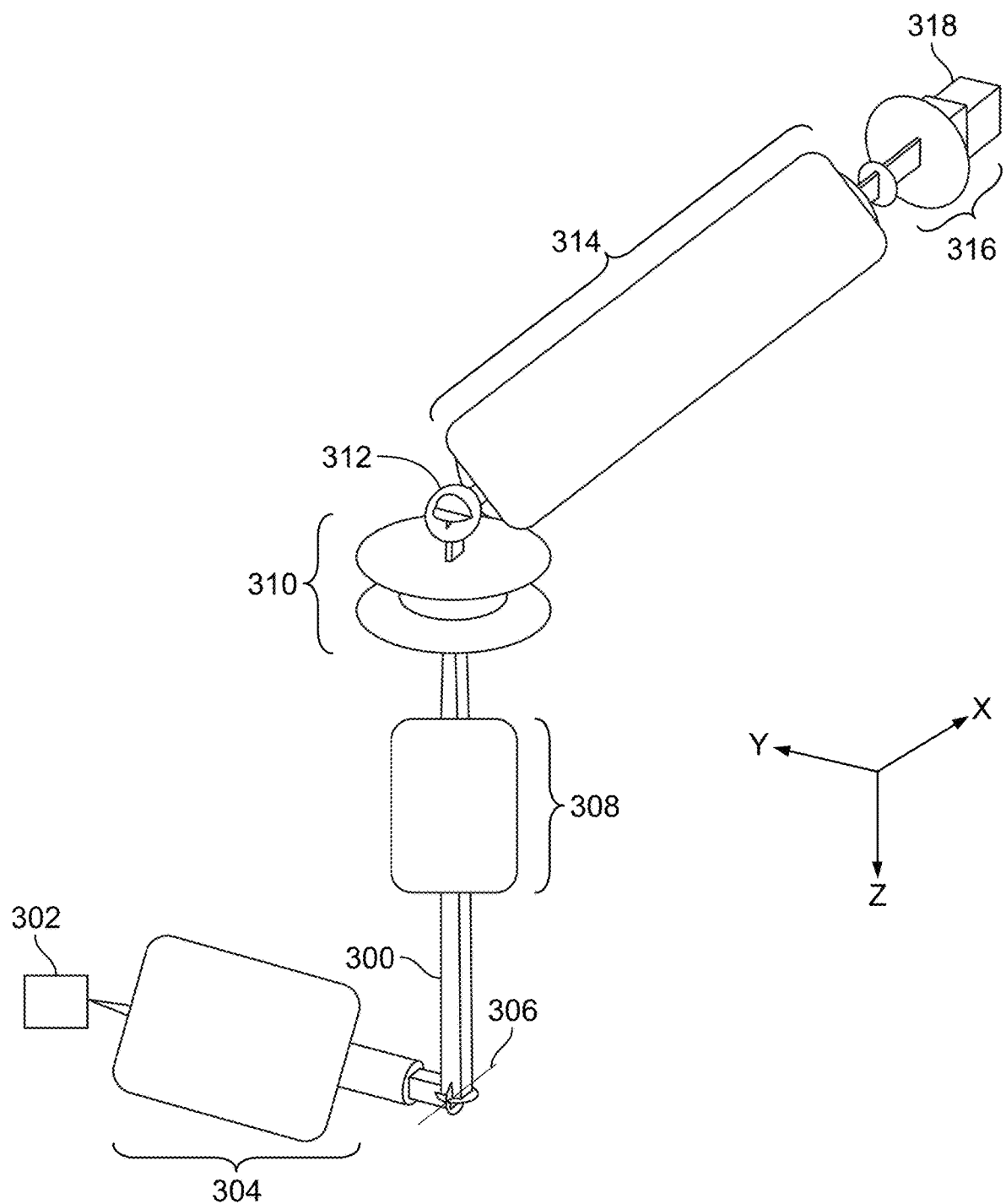
FIG. 3A-FIG. 3D are diagrams illustrating different views of a first embodiment of an illumination path and optical components of an illumination unit.
Figure 3B:
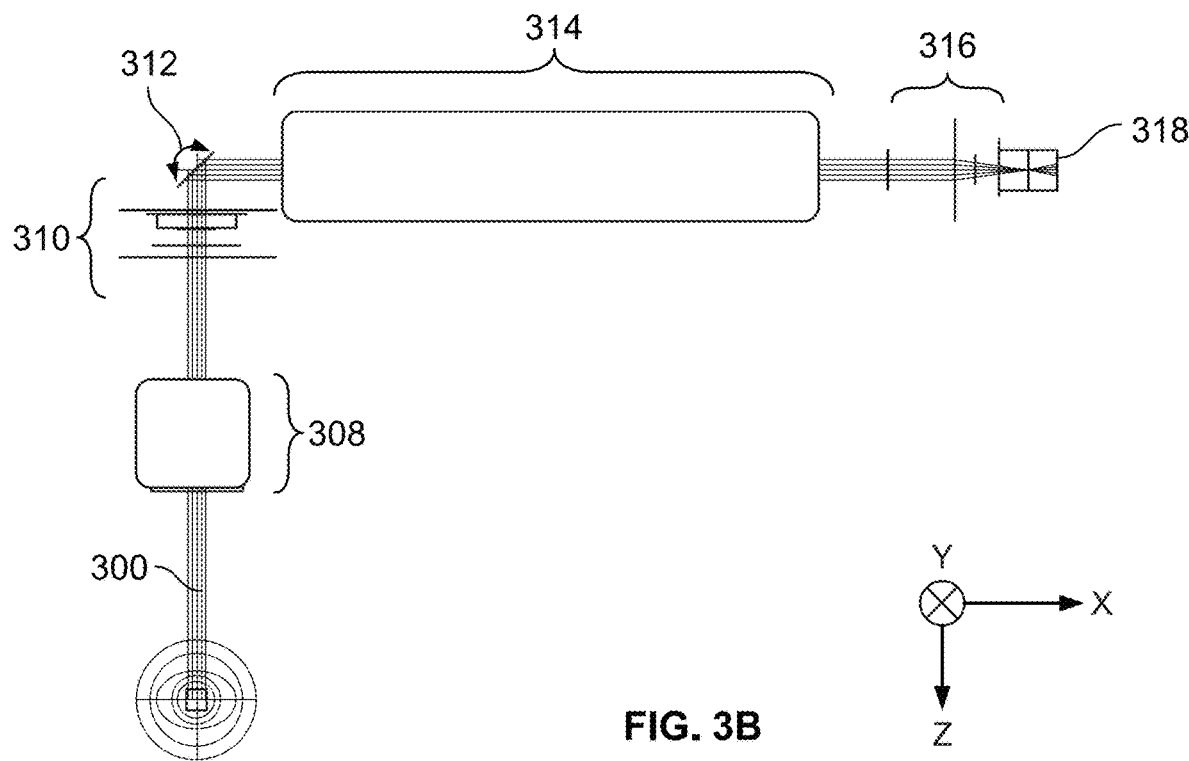
Figure 3C:
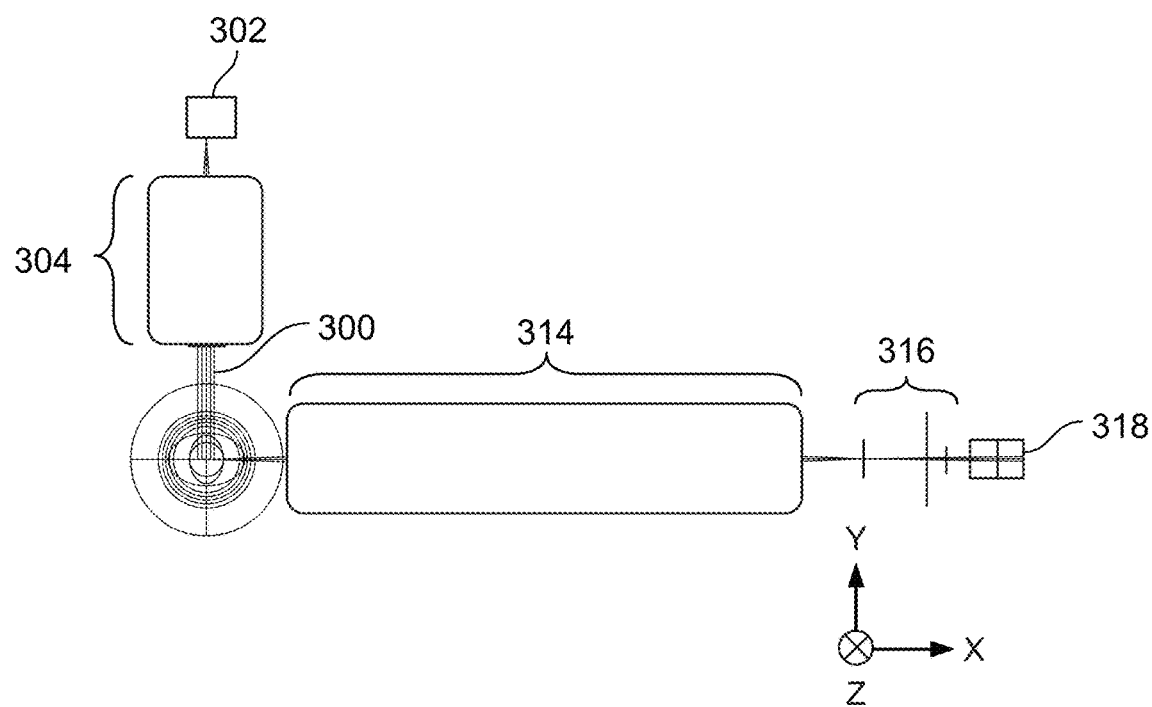
Figure 3D:
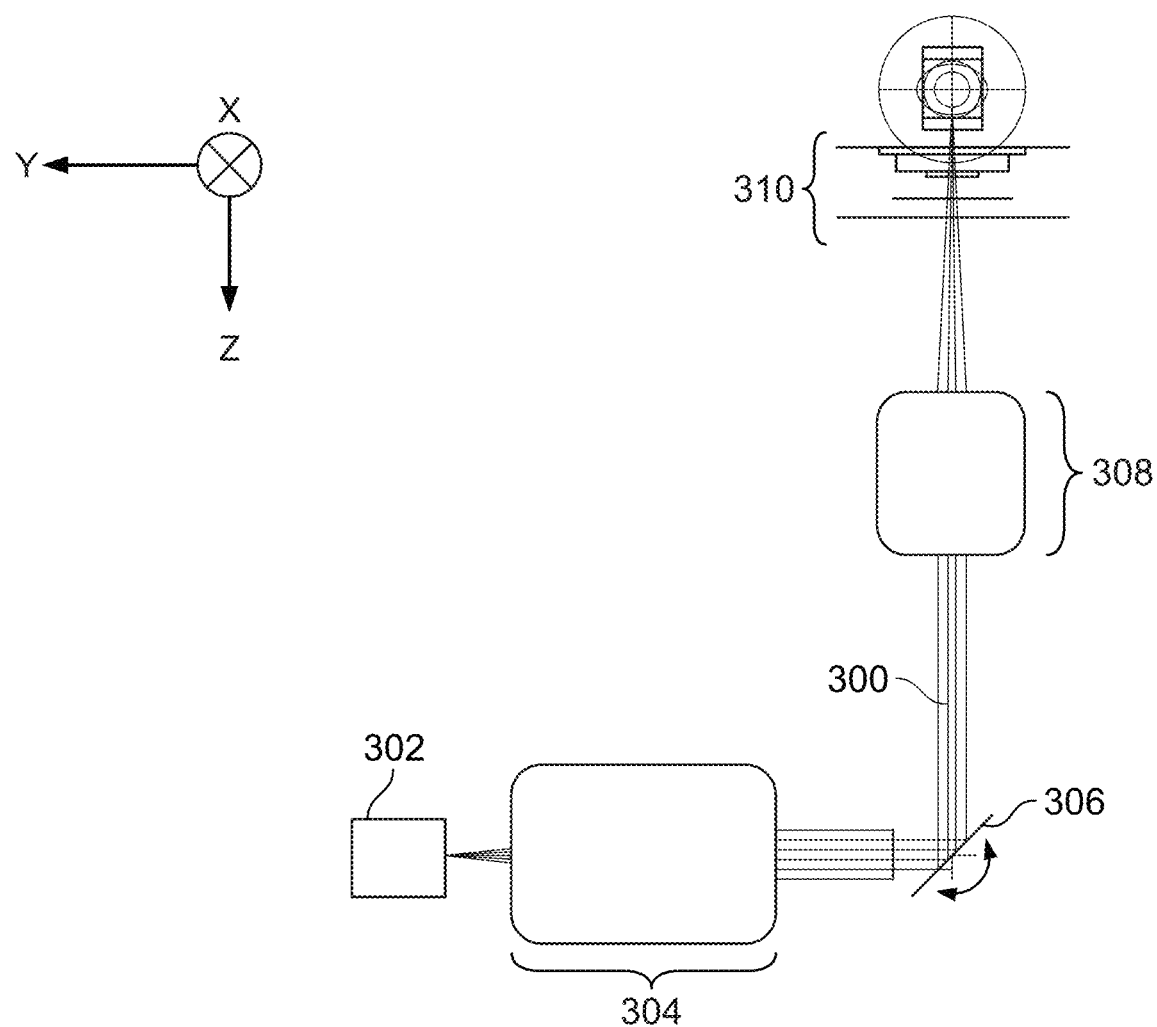

FIG. 3A-FIG. 3D are diagrams illustrating different views of a first embodiment of an illumination path and optical components of an illumination unit. For example, the shown optical components are included and arranged in the shown relative order in illumination component 102 of FIGS. 1A-1B. In some embodiments, two illumination units are utilized and the shown optical components are included and arranged in the corresponding relative order (e.g., mirrored on z-plane from shown arrangement) in illumination component 104 of FIGS. 1A-1B. Not all components of the illumination have been shown. FIG. 3A shows a profile view. FIG. 3B shows a front view. FIG. 3C shows a top view. FIG. 3D shows a side view. The Z-direction axis is the vertical axis.

Illumination path 300 shows a path of light from light source 302 to a specimen in specimen chamber 318 as the light is manipulated by optical components to produce a light sheet to illuminate the specimen. An example of light source 302 is a laser light source that produces a laser light (e.g., laser beam). The light (e.g., light bundle of coherent light) from laser source 302 passes through collimator 304 that aligns the beams of the light using one or more optical lenses. Collimator 304 includes and/or is followed by one or more components with horizontal and vertical slits with adjustable opening widths that allow adjustment of the aperture and field stops. The adjustment of the vertical opening width implements the field stop that influences the width of the light sheet, while the adjustment of the horizontal opening implements the aperture stop that influences the length of the waist (e.g., Length=2×sqrt(2)×Rayleigh length) and the height of the waist of the light sheet. One or more utilized diaphragms (e.g., included in or downstream of the collimator and realizing field and/or angular aperture stops for the light sheet) can be arranged on a changer wheel or maintained in place. The widths of apertures of the diaphragms may be set manually or automatically. A cylindrical lens, for example, can be used as an aspherical optical element.

Next, the light following illumination path 300 is deflected by horizontal optical deflection component 306. An example of horizontal optical deflection component 306 is an oscillating mirror. When optical deflection component 306 is oscillated, it generates scanning horizontal movements of the light sheet (e.g., to reduce shadows in illumination of the specimen). The oscillation of horizontal optical deflection component 306 includes a back and forth rotation (e.g., vibration) about a central rotational axis (e.g., on the x-axis). This oscillation may be achieved via a piezoelectric, mechanical, and/or other electromechanical component. Horizontal optical deflection component 306 is positioned downstream of collimator 304 and diaphragms realizing field and angular aperture stops for the light sheet. As the result of oscillating movement of horizontal optical deflection component 306, the light beam components of the light sheet strike the specimen in specimen chamber 318 at alternating directions many times so as to reduce or remove altogether the shadows caused by opaque specimen substances within the illuminated light sheet plane that might appear in the path of any individual beam component. Thus horizontal optical deflection component 306 enables scanning automatic movement of the horizontal back and forth position (e.g., y-axis direction) of the waist of the light sheet illuminating the specimen.

Then the light following illumination path 300 passes through aspherical component 308 that includes one or more aspherical (e.g., cylindrical lens) optical lens elements (e.g., generates a light bundle with an elliptic cross section).

Then the light following illumination path 300 passes through variable focus lens component 310. An example of variable focus lens component 310 includes an electronically tunable lens with an electronically variable focal distance (e.g., changes focus via electromagnets, piezoelectric element, current through a solution, etc.). Variable focus lens component 310 can be utilized to sweep the focal point across the specimen to create a thinner light sheet over a larger area of the light sheet. For example, focal distance of the illumination lens is automatically and/or continually adjusted/swept across a range of focal distance values to move the focus of the lens across the width of the specimen during image capture to sweep the thinnest point of the light sheet across the specimen. The focal distance of variable focus lens component 310 can be dynamically and automatically tuned/scanned to change the diopter of variable focus lens component 310 in a range that includes both positive and negative diopter values (e.g., between both negative and positive optical powers). For example, variable focus lens component 310 can act both as a converging and diverging lens by electronically adjusting a parameter of variable focus lens component 310. By introducing a lens of variable focal distance into the illumination path of the optical arrangement, sweeping of the light sheet waist is made possible along the illumination direction. Thus variable focus lens component 310 enables automatic movement (e.g., scan) of the horizontal side to side position (e.g., x-axis direction) of the waist of the light sheet illuminating the specimen. In some embodiments, variable focus lens component 310 is positioned at or close to planes optically conjugated with an aperture of illumination objective 316.

Then the light following illumination path 300 is deflected by a vertical optical deflection component 312. An example of vertical optical deflection component 312 is an oscillating mirror. The oscillation of vertical optical deflection component 312 includes a back and forth rotation (e.g., vibration) about a central rotational axis (e.g., on the y-axis). This oscillation may be achieved via a piezoelectric, mechanical, and/or other electromechanical component. When optical deflection component 312 is oscillated, it generates scanning vertical movements of the light sheet. For example, to achieve a scanning vertical (e.g., perpendicular to the plane of the light sheet) movement of the light sheet plane, vertical optical deflection component 312 is positioned downstream of aspherical component 308 generating a light bundle with an elliptic cross section. As the result of linear or oscillating movement of vertical optical deflection component 312, the light beam components of the light sheet strike the specimen at a series of planes thus achieving optical slicing of the specimen, allowing collection of fluorescent emission emitted in consecutive slices within the specimen, by a detector (e.g., digital camera), or to observe the slices in real time directly with an observation lens arrangement (e.g., binoculars). Thus vertical optical deflection component 312 enables automatic movement (e.g., scan) of the vertical position (e.g., z-axis direction) of the waist of the light sheet illuminating the specimen.

Then the light following illumination path 300 passes through optical relay lens component 314. Optical relay lens component 314 includes optical lenses and extends the illumination path and directs the light bundle to the back aperture of illumination objective 316. Using one or more optical lenses, illumination objective 316 emits and focuses the light sheet on the specimen in specimen chamber 318, which is set to emit fluorescent light.

As the result of movement (e.g., linear, oscillating, or other) of the focus of optical components with variable focusing distance, the position of the waist of the light sheet is altered, which results in the illuminating of the substances of the specimen with the light sheet of the thinnest cross section over the widest range along the axis of illumination. This makes it possible to maintain the as fine as possible axial resolution of the light sheet microscopy (e.g., for detection objectives with low to medium numerical aperture (NA), it is determined by the thickness of the light sheet waist) and/or discard the signals from the neighboring slices of the specimen (e.g., for detection objectives with high NA), while imaging at as large as possible a region of interest within the specimen, and, if required, to achieve reduction in shadows occurring within the observed specimen plane as a result of the light sheet illumination.

Figure 4A:
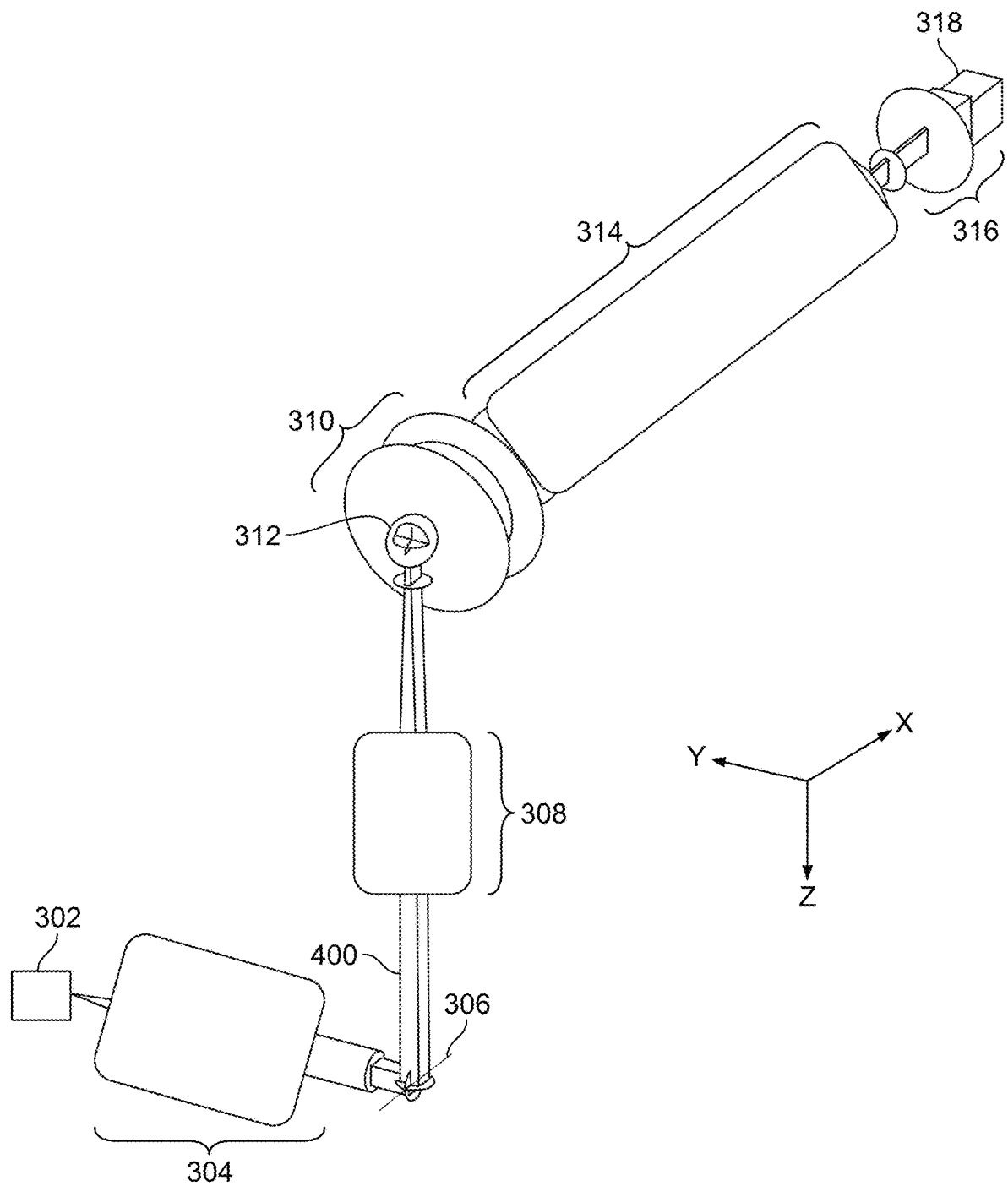
FIG. 4A-FIG. 4D are diagrams illustrating different views of a second embodiment of an illumination path and optical components of an illumination unit.
Figure 4B:
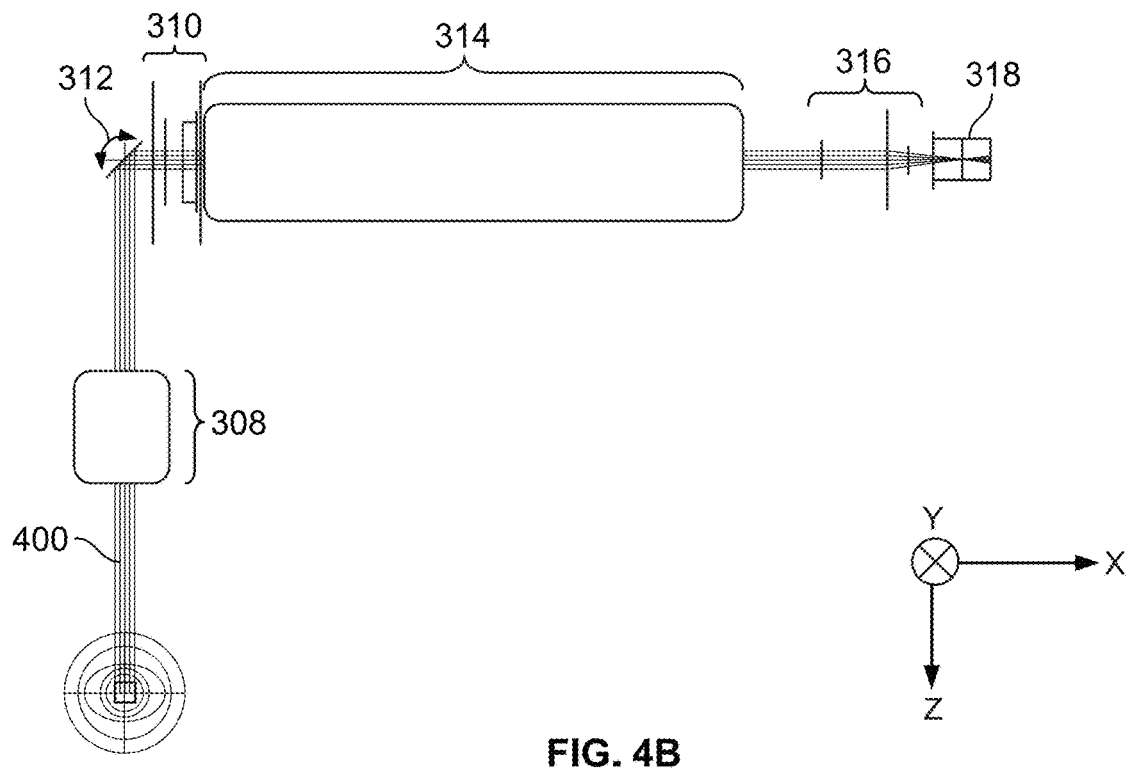
Figure 4C:
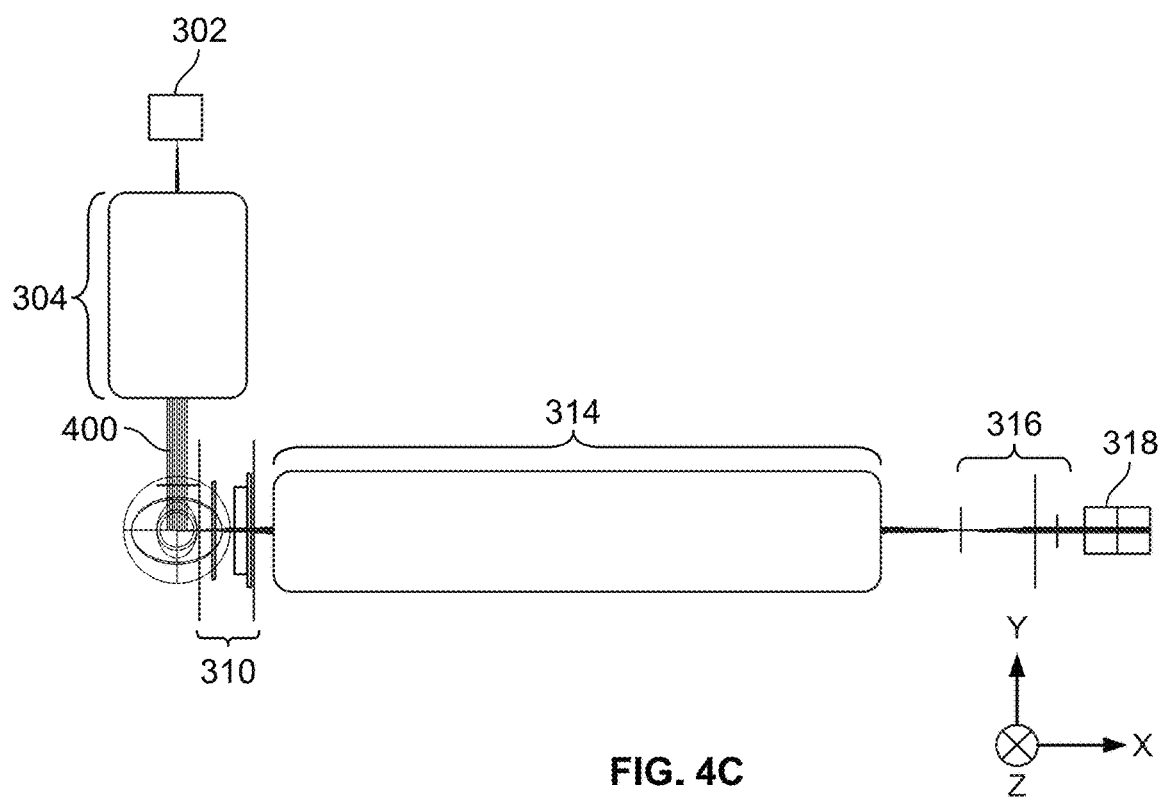
Figure 4D:
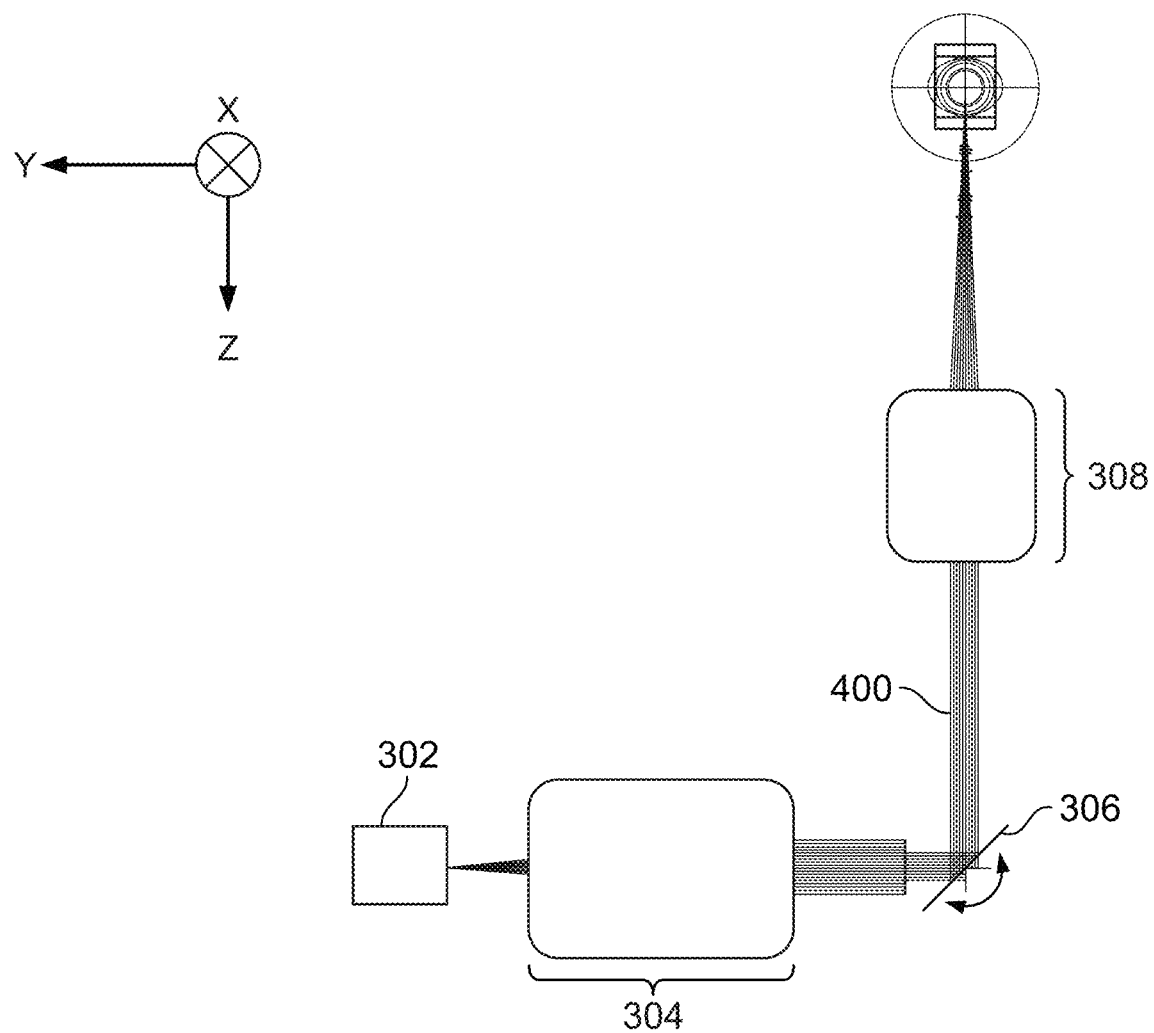

FIG. 4A-FIG. 4D are diagrams illustrating different views of a second embodiment of an illumination path and optical components of an illumination unit. For example, the shown optical components are included and arranged in the shown relative order in illumination component 102 of FIGS. 1A-1B. In some embodiments, two illumination units are utilized and the shown optical components are included and arranged in the corresponding relative order (e.g., mirrored on z-plane from shown arrangement) in illumination component 104 of FIGS. 1A-1B. Not all components of the illumination have been shown. FIG. 4A shows a profile view. FIG. 4B shows a front view. FIG. 4C shows a top view. FIG. 4D shows a side view. The z-direction axis is the vertical axis. A difference between illumination path 400 of FIG. 4A-FIG. 4D and illumination path 300 of FIG. 3A-FIG. 3D includes a location of variable focus lens component 310 in the illumination path relative to the other optical components. In illumination path 400, variable focus lens component 310 is positioned after vertical optical deflection component 312, in between vertical optical deflection component 312 and optical relay lens component 314. This different relative positioning of variable focus lens component 310 allows the shown components to fit in a different physical form factor that may be desired or necessary in certain configurations.

Figure 5A:
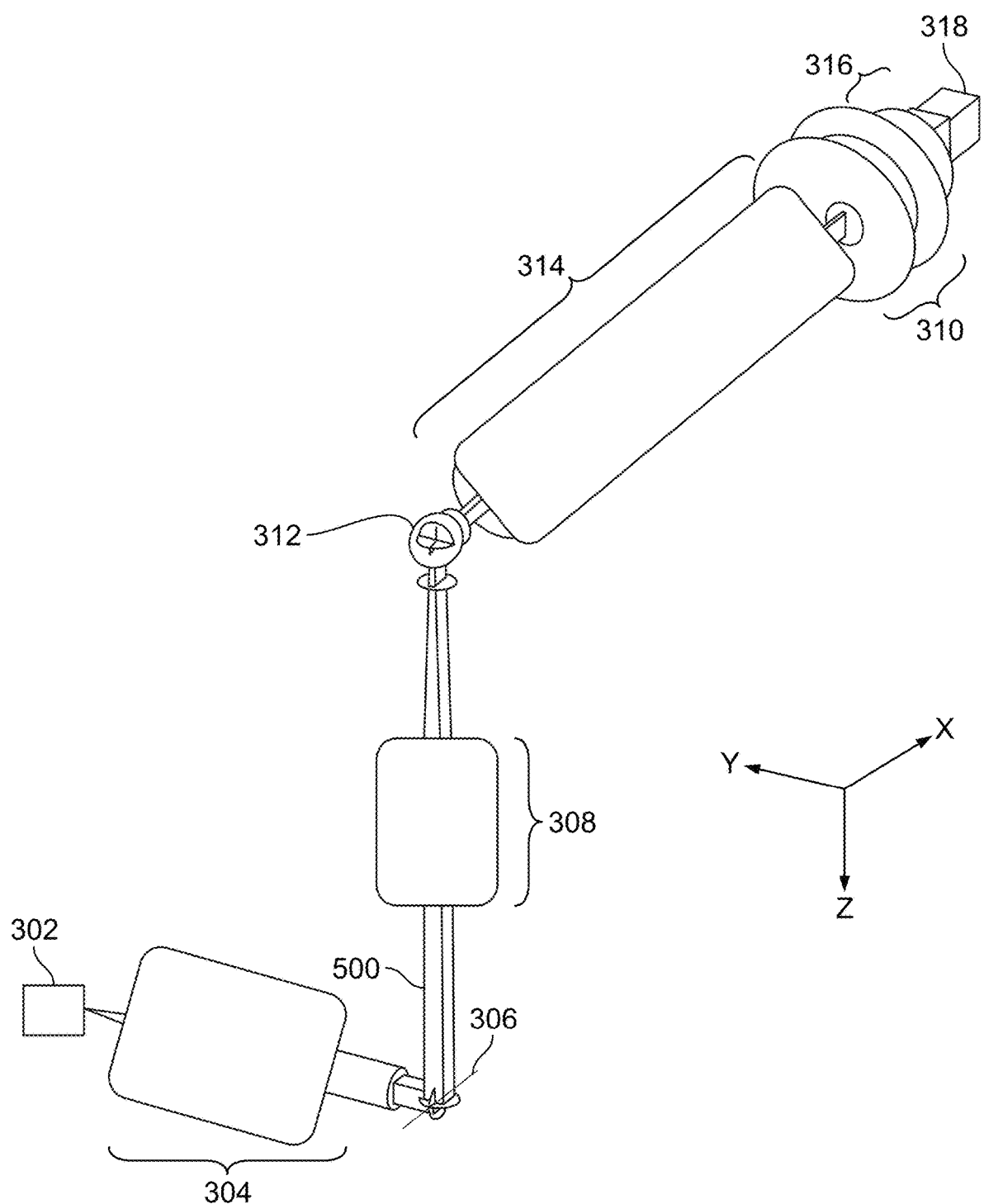
FIG. 5A-FIG. 5D are diagrams illustrating different views of a third embodiment of an illumination path and optical components of an illumination unit.
Figure 5B:
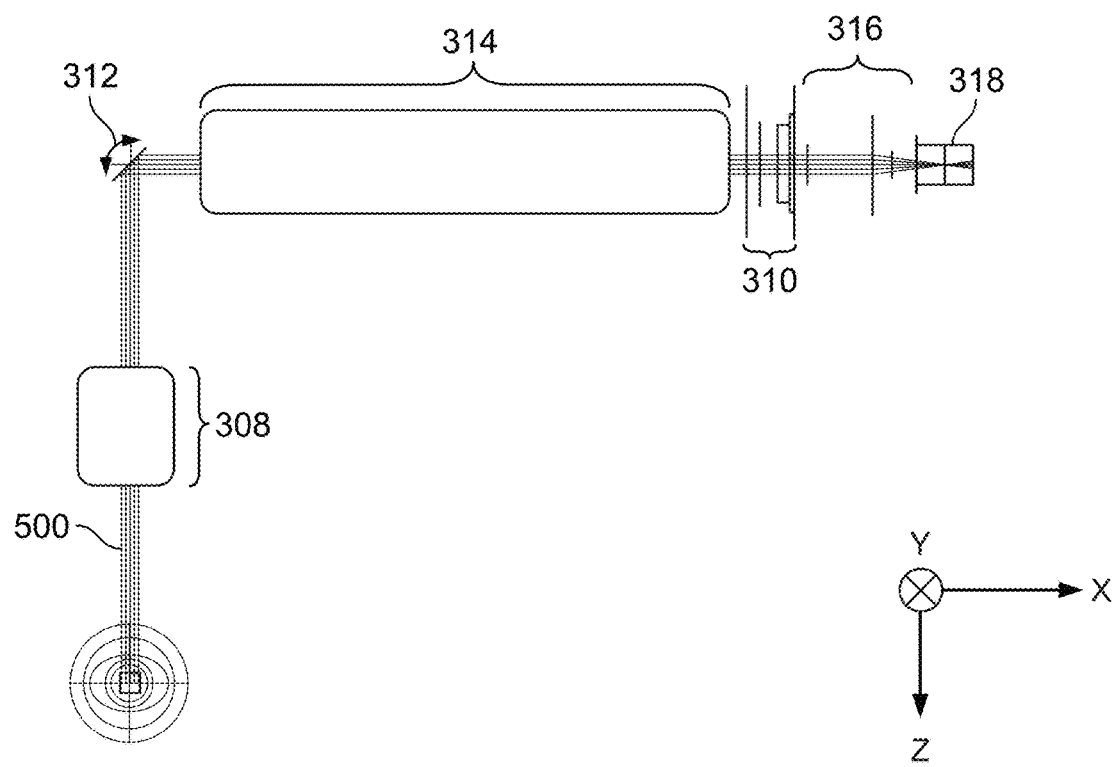
Figure 5C:
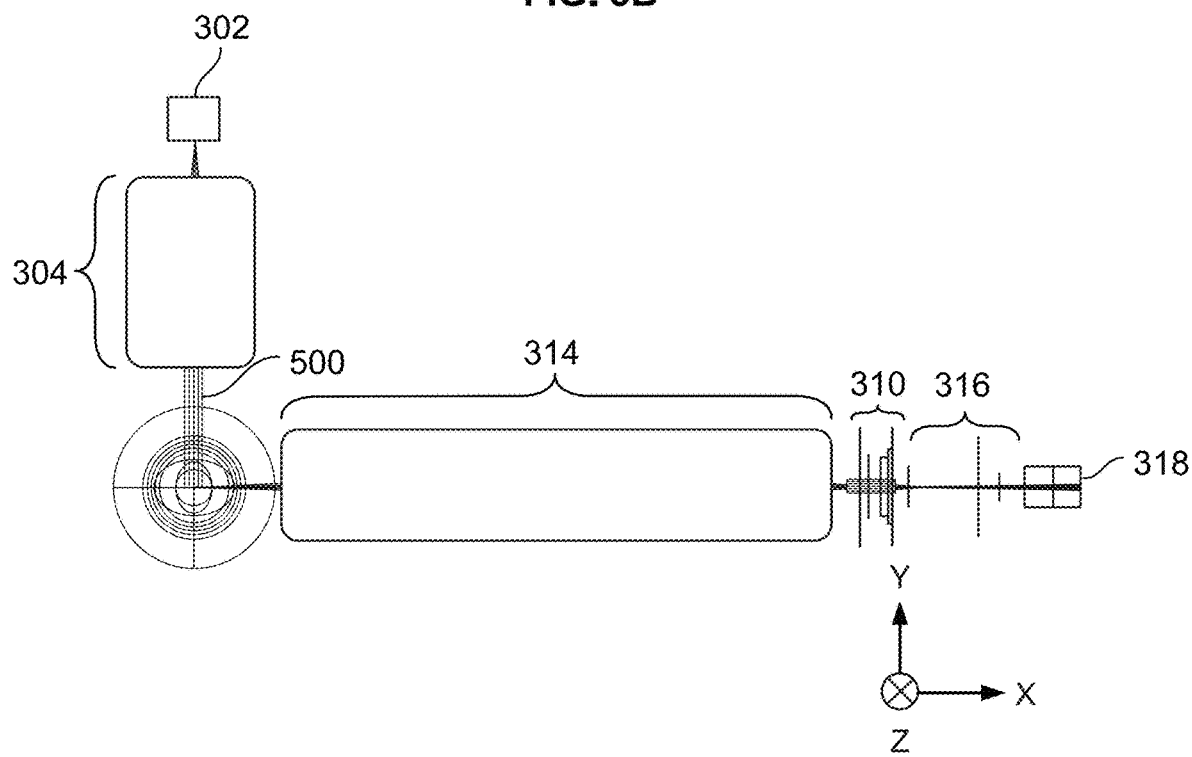
Figure 5D:
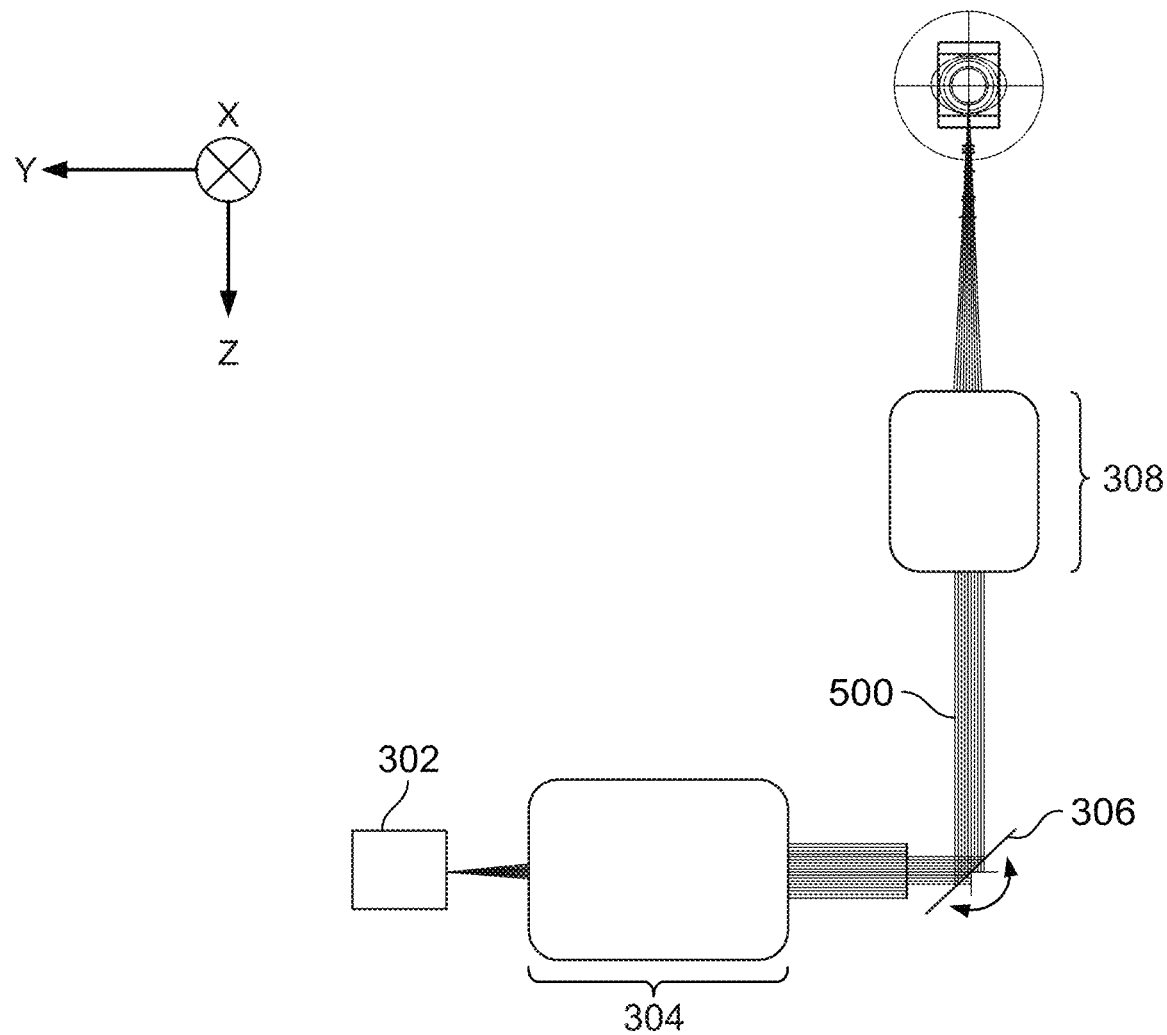

FIG. 5A-FIG. 5D are diagrams illustrating different views of a third embodiment of an illumination path and optical components of an illumination unit. For example, the shown optical components are included and arranged in the shown relative order in illumination component 102 of FIGS. 1A-1B. In some embodiments, two illumination units are utilized and the shown optical components are included and arranged in the corresponding relative order (e.g., mirrored on z-plane from shown arrangement) in illumination component 104 of FIGS. 1A-1B. Not all components of the illumination have been shown. FIG. 5A shows a profile view. FIG. 5B shows a front view. FIG. 5C shows a top view. FIG. 5D shows a side view. The z-direction axis is the vertical axis. A difference between illumination path 500 of FIG. 5A-FIG. 5D and illumination path 300 of FIG. 3A-FIG. 3D includes a location of variable focus lens component 310 in the illumination path relative to the other optical components. In illumination path 500, variable focus lens component 310 is positioned after optical relay lens component 314, in between optical relay lens component 314 and illumination objective 316. This different relative positioning of variable focus lens component 310 allows the shown components to fit in a different physical form factor that may be desired or necessary in certain configurations.

FIG. 6A-FIG. 6E are diagrams illustrating various embodiments of focusing unit add-ons to an optical microscope. High spatial and temporal resolution for a 3D light sheet imaging allows observation of physiological processes of living specimens while keeping them in their natural state without perturbation. Typical methods based on mechanical motion of the specimen for volume acquisition introduce vibrations during the acquisition and limit the scanning speed. As water-dipping objectives are customarily used for observation of biologic specimens in the specimens' natural medium, perturbations from a moving detection objective may influence the specimen behavior under observation and restrain the scope of application for dynamic studies. Larger specimens can also exceed the laser waist (focus) area and reduce the optical sectioning power of the light sheet assembly. In some embodiments, fast and vibration free 3D acquisition is performed using tunable lenses. For example, in order to generate a 3D image of a specimen using SPIM, each slice of the specimen at different depths is illuminated using a light sheet and captured using a lens focused on the slice. The image of the specimen at different depths then can be digitally processed and combined to generate a 3D rendering of the specimen. One way to capture the various slices of the specimen at different depths is to physically move the specimen up and down and/or side to side in increments. However as discussed previously, vibrations introduced in physically moving the specimen may lead to drawbacks.

In some embodiments, instead of moving the specimen for scanning the depth of the specimen, a scanning device based on the lens of dynamically variable focal distance is utilized. Video output focusing unit 602 may be inserted into the detection path between a microscope's video output port and a digital camera, and detection objective output focusing unit 620 may be inserted between the microscope's detection objective and the microscope turret and/or tube lens. One or both of focusing unit 602 and focusing unit 620 may be utilized in various embodiments. Inserting the focusing unit between the optical microscope and the digital camera provides a possibility to switch between several microscope objectives attached to the microscope turret. Inserting the focusing unit between the optical objective and the objective turret of that microscope provides for wider vertical scanning range. Inserting two focusing units, each containing at least one lens of a variable focal distance, is also possible. In that case, one lens (or a set thereof) of a variable focal distance serves as a means to select an average height of the light sheet plane within the specimen, while the other (or the set thereof) serves as a means of selecting a series of planes around the latter plane.

The specimen sample (e.g., in its chamber) is set in a fixed position when the illumination plane (e.g., light sheet is physically moved up and down) and the detection plane move simultaneously through the specimen automatically in sync. The detection plane may be moved by automatically varying the vertical focusing distance of the lens of a focusing unit. In some embodiments, rather than relying on a mechanical motor mechanism that may introduce vibrations, the focusing distance of a focusing unit may be changed electrically (e.g., via an electrically tunable lens that changes focus via electromagnets, piezoelectric element, current through a solution, etc.) without a use of a motor. As the specimen remains in a steady position, vibrations and perturbation issues are alleviated. Incidental specimen mounting and holding becomes much easier. Additionally, if a wider field of view of the specimen is desired, the horizontal sweeping of the "waist" focus of the light sheet as previously discussed may be used in conjunction with the vertical variable focus. This allows the acquisition of images in the light sheet mode where the image of the portion of the specimen being acquired is synchronized using an electronic synchronization system and is automatically focused on the thinnest area of the laser beam being swept vertically and/or horizontally. By synchronizing the detection plane and the light sheet illumination plane, it is possible to collect the fluorescent emission coming essentially only from the light sheet illumination plane. Hence, it provides the sharpest optical sectioning in the whole frame, greatly reducing shadows occurring within the observed specimen.

By setting the focal distance of this lens so as to achieve optical conjugation between the light sheet plane within the specimen and the camera plane, an image of the selected slice within the specimen can be recorded and/or observed. If required, an electronic system including a processor driven by a software program is provided to achieve an automatic optical coupling between the camera plane and the light sheet plane, thus allowing fast 3D light sheet microscopy. The light sheet scanning capability in the illumination path and associated focusing capability onto different planes within the observed specimen in the detection path ensures the optical coupling between the flat illuminated slice within the specimen and the surface of the digital camera with no mechanical movement of the specimen. Avoidance of the mechanical movement of the specimen speeds up collecting light sheet microscopy data, with associated reduction of photo bleaching. Also, this precludes its deformation by the cumulative forces exerted on it by strain related with the interface between the specimen and the water-dipping objective through the matching objective-specimen liquid.

In some embodiments, focal distance of the illumination lens is automatically adjusted to move and sweep the focus of the lens across a range covering the width of the specimen during image capture to automatically sweep the thinnest point of the light sheet across the width of the specimen, and scanning lines of a rolling shutter of the detector (e.g., digital camera) are synchronized with the sweeping position of the waist of the light sheet, allowing a sharper image and a larger field of view without physically moving the specimen within the plane of the light sheet.

By integrating these scanning means, the light sheet system not only provides optical sectioning with optimal spatial resolution and signal to noise ratio, but also delivers unprecedented temporal resolution for 3D acquisition, addressing the needs for dynamic imaging of rapid biophysical processes.

Figure 6A:
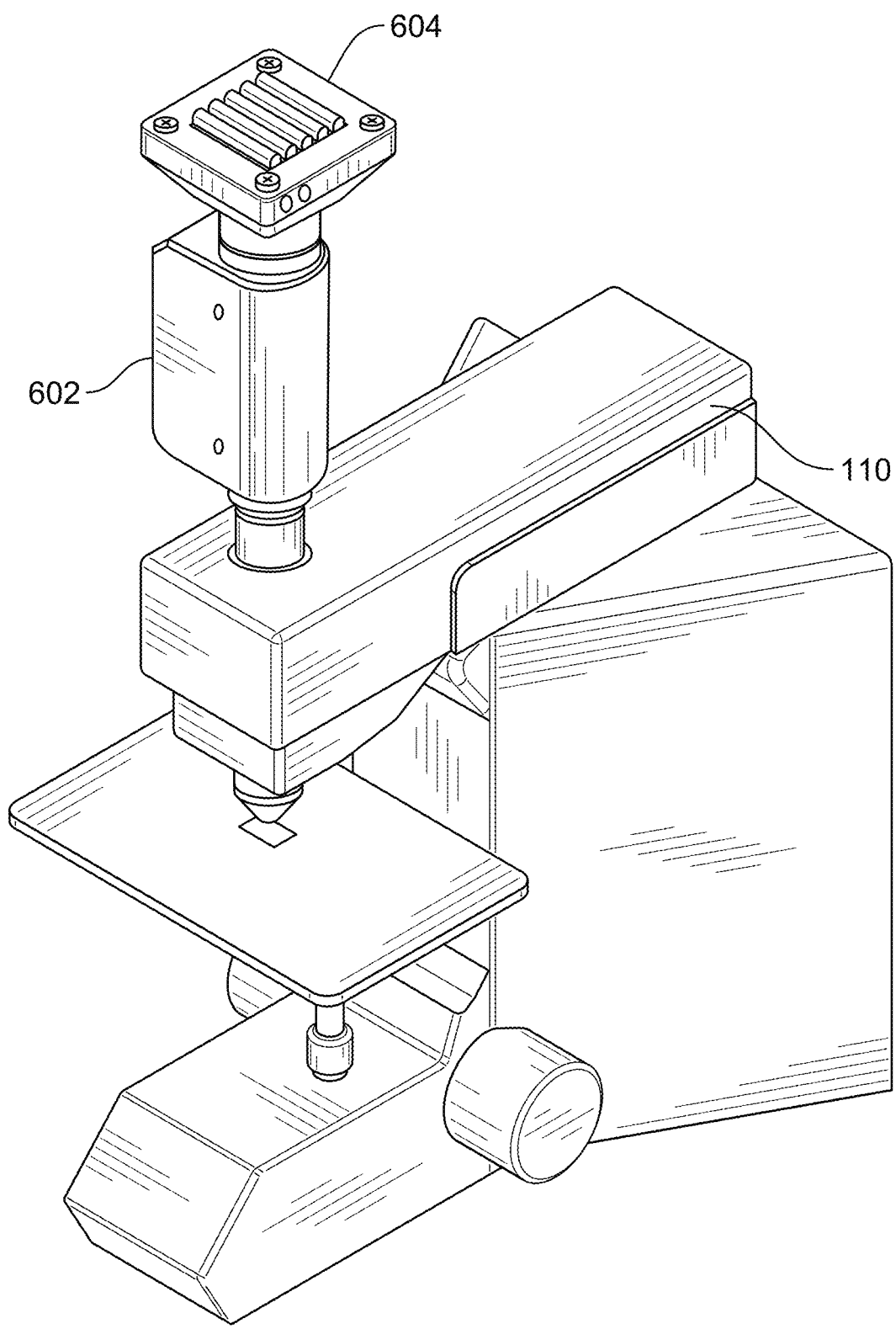
FIG. 6A-FIG. 6E are diagrams illustrating various embodiments of focusing unit add-ons to an optical microscope.
Figure 6B:
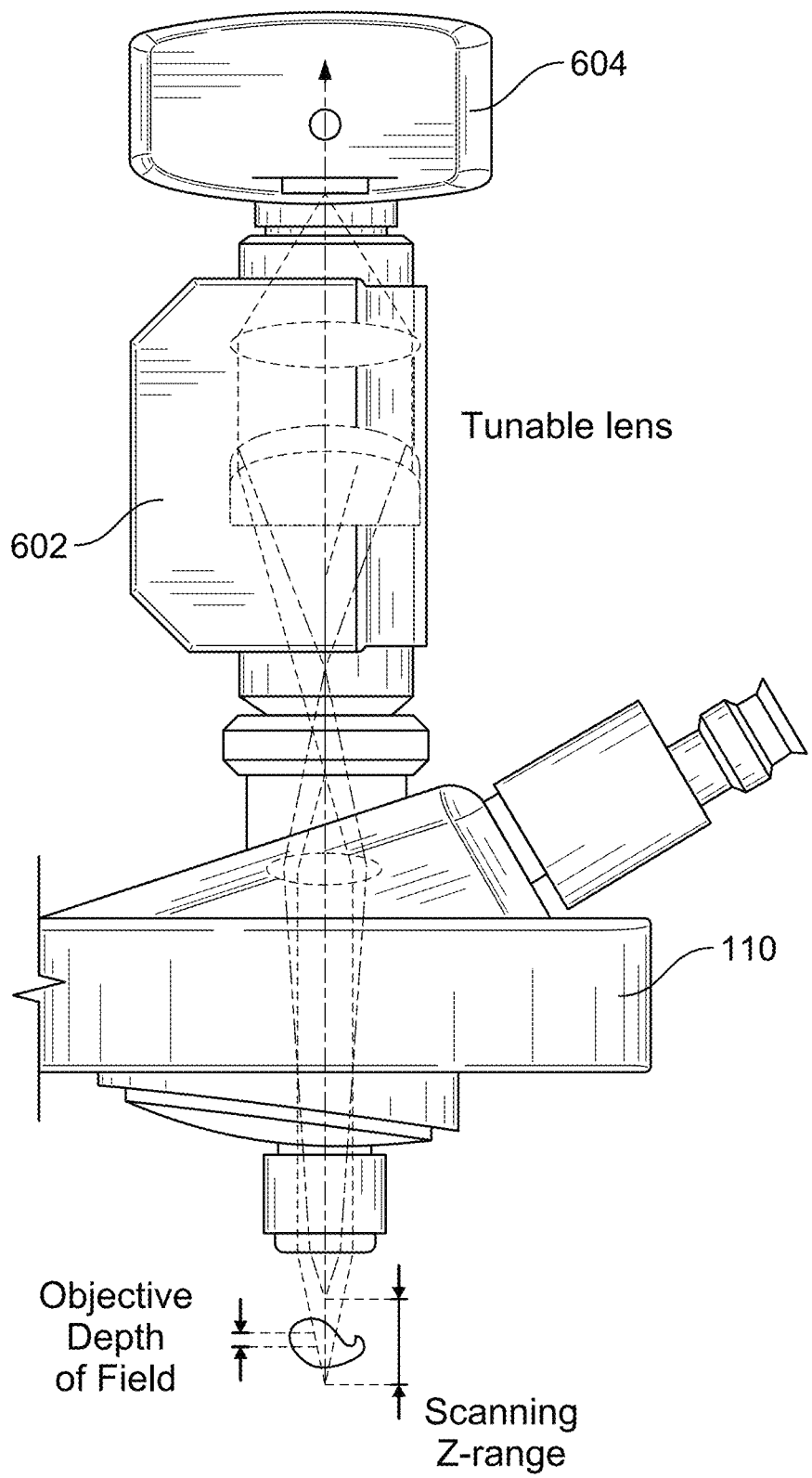
Figure 6C:
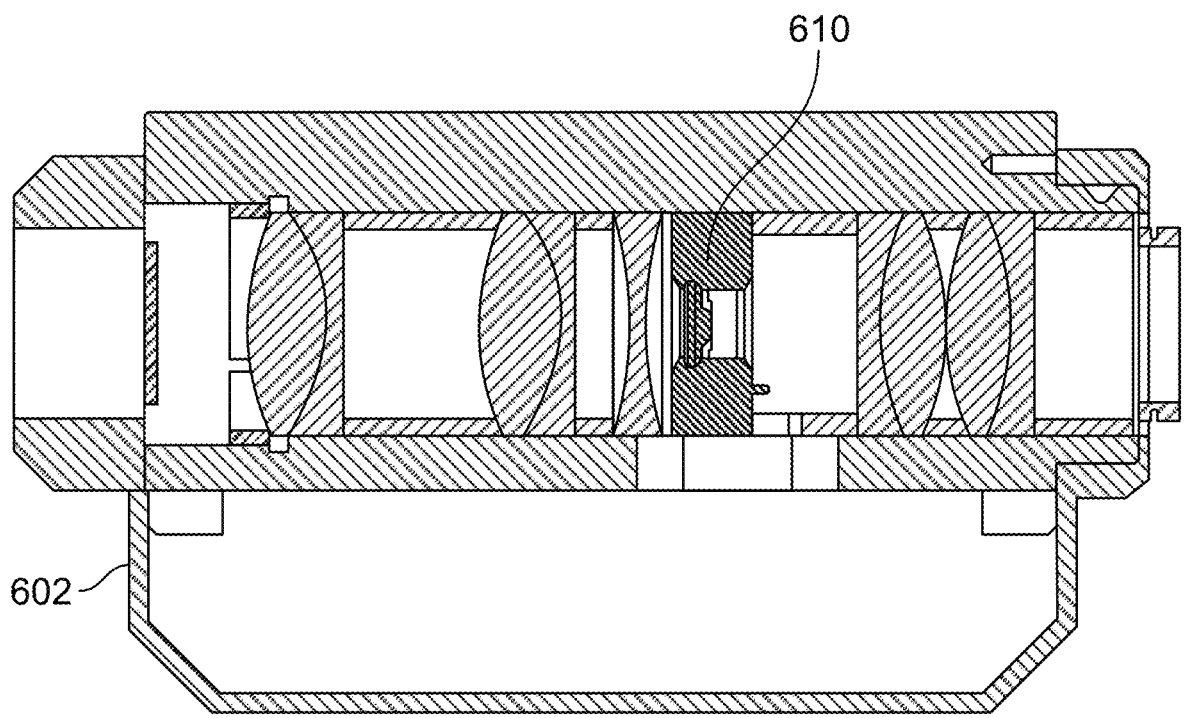

FIG. 6A-FIG. 6C are diagrams illustrating an embodiment of a video output focusing unit add-on to an optical microscope. Video output focusing unit 602 is coupled to a video output port (e.g., C-Mount interface) of optical microscope 110 and an optical input of digital camera 604 (e.g., via screw-threaded, press fit, friction, locking, bayonet, or any other types of connecting/mounting interfaces). For example, focusing unit 602 is included in and/or coupled to detection unit 112 of FIG. 1B. Digital camera 604 is coupled to focusing unit 602 and digital camera 604 captures an image of a specimen obtained via an optical path of lenses of focusing unit 602 added to the optical detection path of microscope 110. Focusing unit 602 has an optical axis that is substantially parallel to the optical axis of the detection objective of the optical microscope for manual or automatic focusing onto the same geometrical plane substantially perpendicular to the optical axis of the detection objective of the optical microscope, which is illuminated by the light generated by one or more illumination sources. Focusing unit 602 includes an arrangement of optical elements with at least one optical element that is able to dynamically change focal distance (e.g., tunable lens 610). FIG. 6C shows an internal cutaway view of focusing unit 602. Tunable lens 610 is able to change its focusing distance electrically (e.g., via electromagnets, piezoelectric element, current through a solution, etc.) without a use of a motor. In other embodiments, focusing distance of focusing unit 602 may be changed mechanically.

Figure 6D:
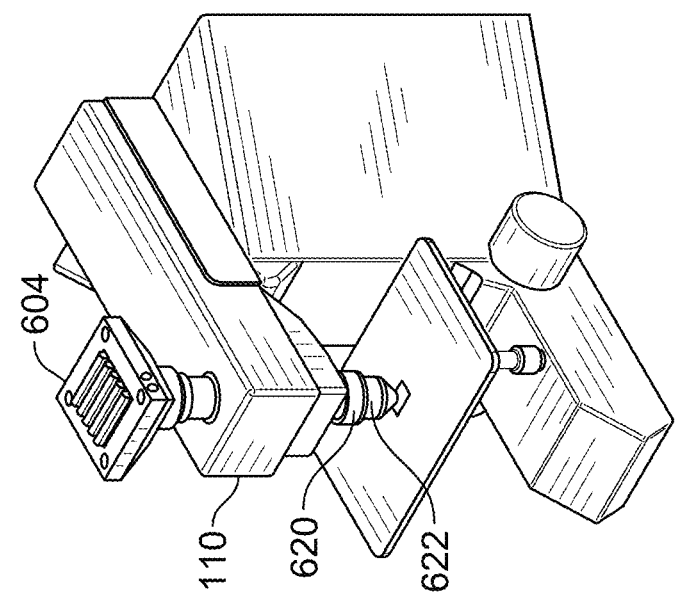
Figure 6D:
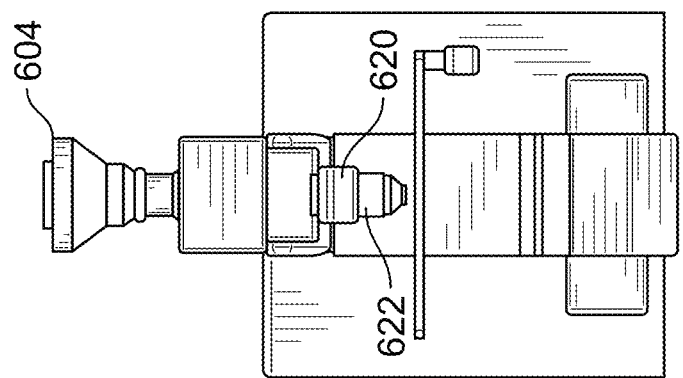
Figure 6D:
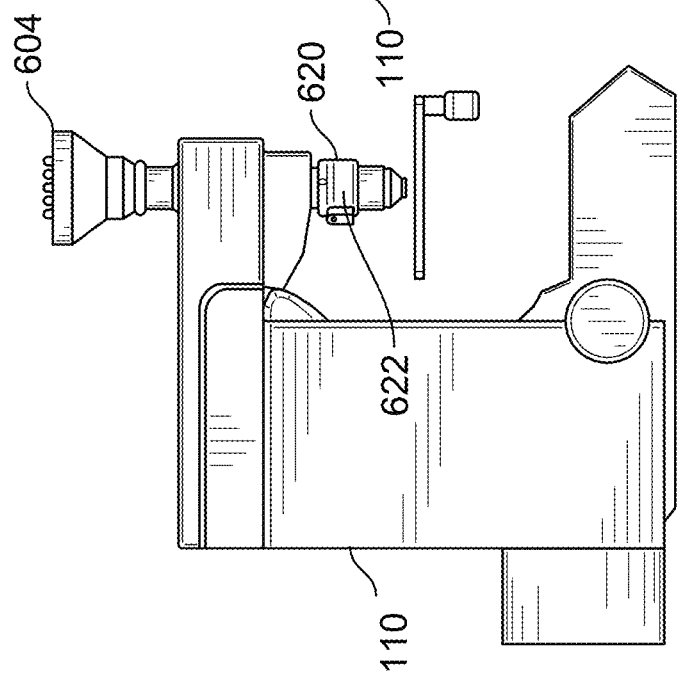
Figure 6E:
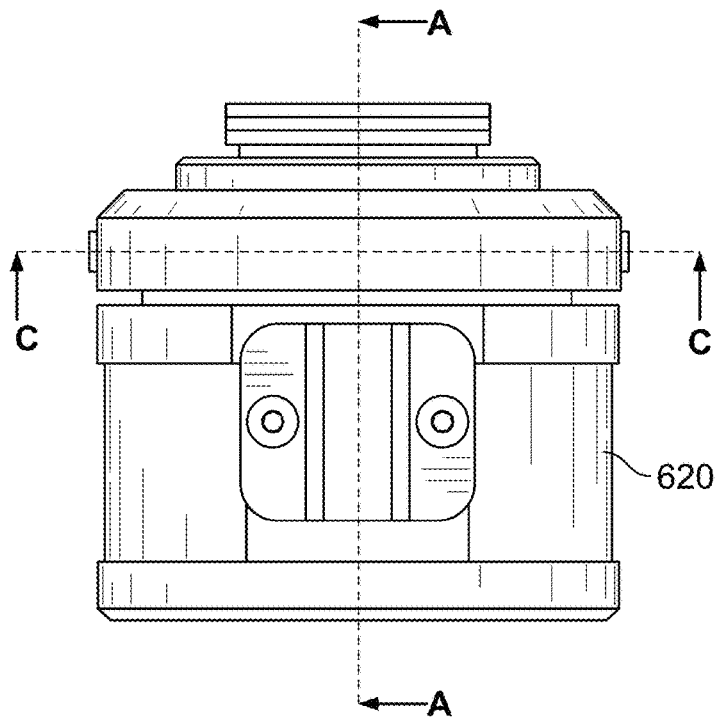
Figure 6E:
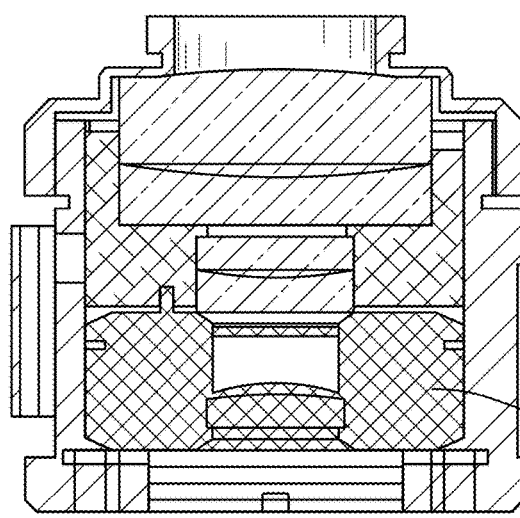
Figure 6E:
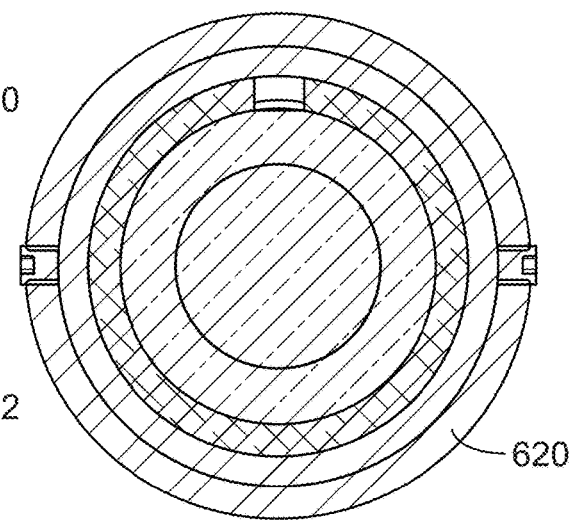

FIG. 6D-FIG. 6E are diagrams illustrating an embodiment of a detection objective output focusing unit add-on to an optical microscope. Detection objective output focusing unit 620 is directly coupled to detection objective 622 and the microscope turret and/or tube lens of optical microscope 110 (e.g., via screw-threaded, press fit, friction, locking, bayonet, or any other types of connecting/mounting interfaces). For example, focusing unit 620 functions an intermediary optical element between optical detection objective 622 and a microscope turret of optical microscope 110. For simplicity, a spherical aberration correction collar analogous to correction collar 207 is not shown in FIGS. 6A-6E. Digital camera 604 is coupled to focusing unit 620 and digital camera 604 captures an image of a specimen obtained via an optical path of lenses of focusing unit 620 added to the optical detection path of microscope 110. Focusing unit 620 has an optical axis that is substantially parallel to the optical axis of the detection objective of the optical microscope for manual or automatic focusing onto the same geometrical plane substantially perpendicular to the optical axis of the detection objective of the optical microscope, which is illuminated by the light generated by one or more illumination sources. Focusing unit 620 includes an arrangement of optical elements with at least one optical element that is able to dynamically change focal distance (e.g., tunable lens 622). FIG. 6E shows an external side view and various internal cutaway views of focusing unit 620. Tunable lens 622 is able to change its focusing distance electrically (e.g., via electromagnets, piezoelectric element, current through a solution, etc.) without a use of a motor. In other embodiments, focusing distance of focusing unit 620 may be changed mechanically.

Figure 7:
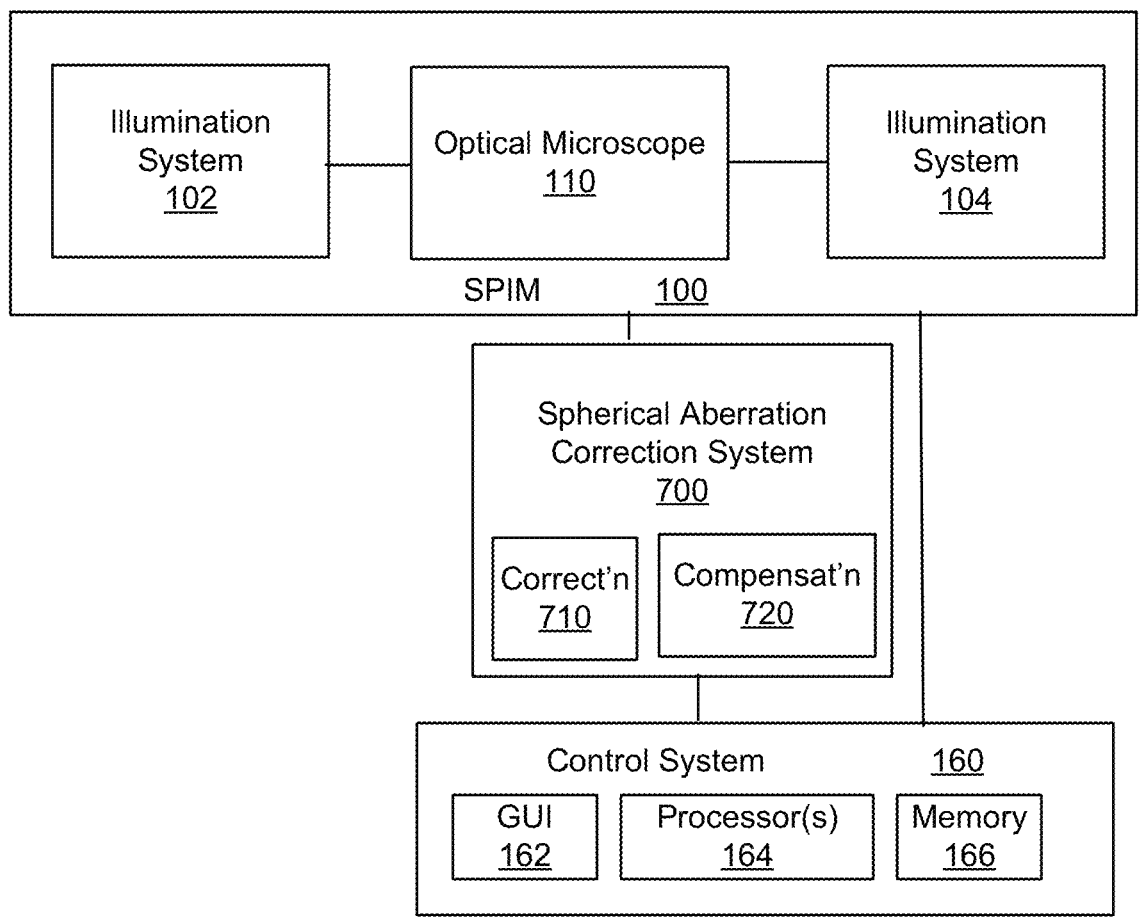
FIG. 7 is a block diagram illustrating an embodiment of a spherical aberration correction system used in connection with a light sheet microscope.

FIG. 7 is a block diagram illustrating an embodiment of spherical aberration correction system 700 used in connection with a light sheet microscope (SPIM) 100. System 700 is thus shown along with illumination systems 102 and 104 and optical microscope 110. Illumination systems 102 and 104 thus each include an illumination source and optical elements. The illumination source emits light that travels along an illumination path to illuminate a microscopy specimen placed in the optical detection path of optical microscope 110. The optical elements in the illumination path transform the light from the illumination source into a light sheet illuminating the microscopy specimen. The light sheet is movable through at least a portion of the microscopy specimen. Optical microscope 110 includes detection objective(s), at least one of which is placed in an optical detection path of optical microscope 110. Add-ons to the optical microscope, such as focusing unit 620 and other features shown in FIGS. 6A-6E may be considered part of optical microscope 110. Also shown is control system 160. Control system 160 may be a computer system including graphical (or other) user interface (GUI) 162, one or more processors 164, and memory 166. Other components of control system 160 and SPIM 100 may be present but are not shown and/or not discussed for simplicity.

Optical microscope 110 and illumination unit(s) 102 and/or 104 in conjunction with control system 160 and spherical aberration correction system 700 are configured to allow for automatic correction of spherical aberrations and compensation of the focus shift due to the correction of spherical aberrations. As previously discussed, temporal and/or spatial variations in the refractive index of the microscopy specimen (e.g. the sample desired to be imaged and/or the solution in which the specimen is located) can give rise to spherical aberrations. For example, there may be a mismatch between the refractive index of some or all of the microscopy specimen and the range for which the detection objective is designed. Spherical aberration correction system 700 may be utilized to address this.

Spherical aberration correction system 700 (hereinafter system 700) includes correction subsystem 710 and a compensation subsystem 720. Correction subsystem is coupled with one or more detection objectives (not explicitly shown in FIG. 7) of optical microscope 110. The correction subsystem provides a correction of a spherical aberration for the detection objective. For example, correction subsystem 710 may include a correction collar (e.g. correction collar 207) on the detection objective being utilized. Correction subsystem 710 rotates the correction collar, which translates a lens within the detection objective. Thus, the rotation of the correction collar changes the axial position of internal lenses in the objective. The change in position of the lens introduces an opposite aberration to the spherical aberration caused by the refractive index mismatch. In general, the correction collar allows the objective to be compatible with imaging solutions with refractive indices in a certain range. In some embodiments, the correction collar may be used in connection with refractive indices between 1.33 and 1.52. The amount by which the correction collar is rotated and thus the distance the lens is translated, may be controlled by control system 160.

Although correction subsystem 710 (e.g. via a correction collar) can correct for spherical aberrations, rotating the correction collar slightly changes the position of the focal plane of the detection objective. Compensation subsystem 720 is coupled with correction subsystem 710 and configured to adjust a position a waist of the light sheet based on the correction. To do so, compensation subsystem 720 may control portions of SPIM 100. In some embodiments, compensation subsystem 720 utilizes portions of optical microscope 110 in the optical detection path and/or portions of illumination system(s) 102 and/or 104 in the illumination path. Compensation subsystem re-aligns the focal plane of the detection objective (after spherical aberration correction using correction subsystem 710) with the waist of the light sheet. In some embodiments, compensation subsystem 720 does so by changing the focal length of the detection objective of optical microscope 110. This may be achieved via an electronically tunable lens, such as electronically tunable lens 610, in the optical detection path of optical microscope 110. In some embodiments, compensation subsystem 720 re-aligns the focal plane of the detection objective with the waist of the light sheet by changing the position of the light sheet waist. In some embodiments, this is achieved using a deflector, such as optical deflection component 312, in the illumination path of illumination systems 102 and 104. In some embodiments, compensation subsystem 720 uses a combination of a focal length shift of the detection objective and a change in the position of the light sheet along the detection path. Thus, the focal shift induced by the spherical aberration correction can be accounted for.

In order to correct spherical aberration and compensate for a focus shift, system 700 may be calibrated and controlled by control system 700. The rotation angle of the correction collar and the position of the focal plane of the objective for each angle of rotation may be determined empirically by e.g., maximizing contrast in the acquired images. For example, the required rotation of the correction collar, the induced focus shift, and the compensation provided may be calibrated for various locations of the microscopy sample (e.g. by stepping a sample through various heights along the detection path) and various spherical aberrations. The results of this calibration may be stored in memory 166. Processor(s) 164 may use the calibrations, including interpolating between various results, to provide the appropriate spherical aberration correction and compensation using subsystems 710 and 720. Further, for SPIM 100, several detection objectives may be placed on a rotatable objective turret that can be used in order to provide a macro-view of the whole of the sample followed by its detailed micro-view. Such a turret may be analogous to that described in the context of FIGS. 6A-6E. Thus, the calibration and control described for one objective in the context of system 700 may be repeated for multiple objectives of optical microscope 110.

Using system 700 in conjunction with SPIM 100 allows for both spherical aberration correction and focus shift compensation to be provided. Further, because control system 160 applies these corrections, the speed and/or accuracy of the correction and compensation may be improved. In addition, system 700 may correct for spherical aberrations and focus shift in multiple images captured by SPIM 100. Thus, performance of SPIM 100 may be improved.

Figure 8A:
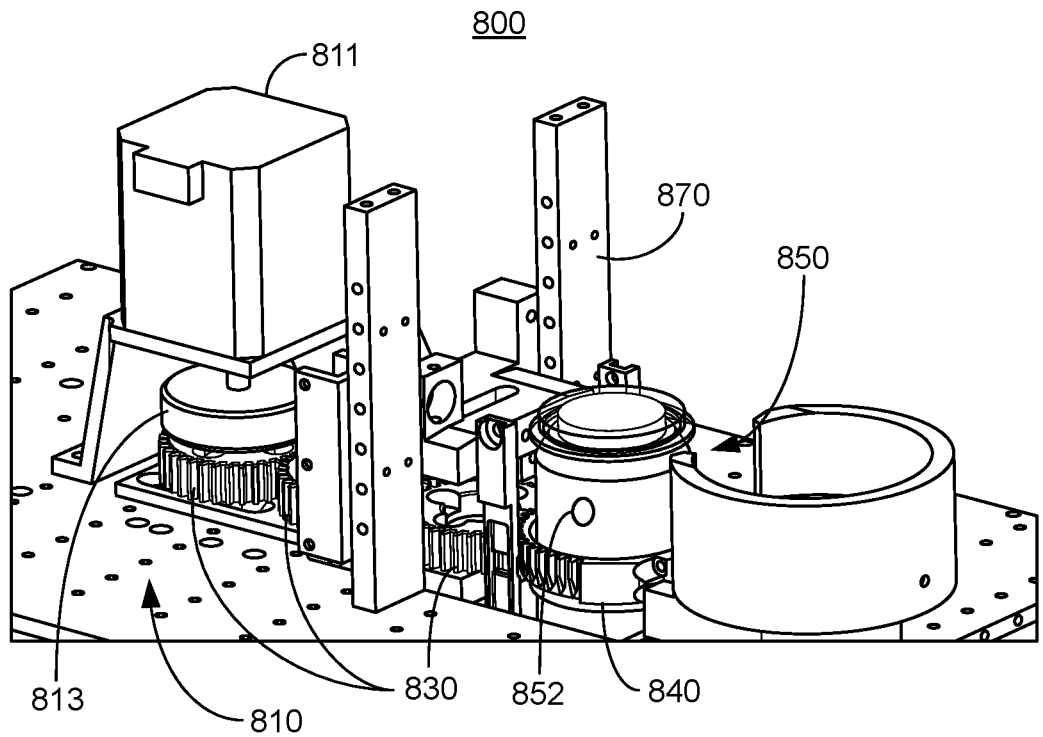
FIGS. 8A-8C are diagrams depicting various views of an embodiment of spherical aberration correction system 800 used in connection with a light sheet microscope (SPIM) in which system 800 is used.
Figure 8B:
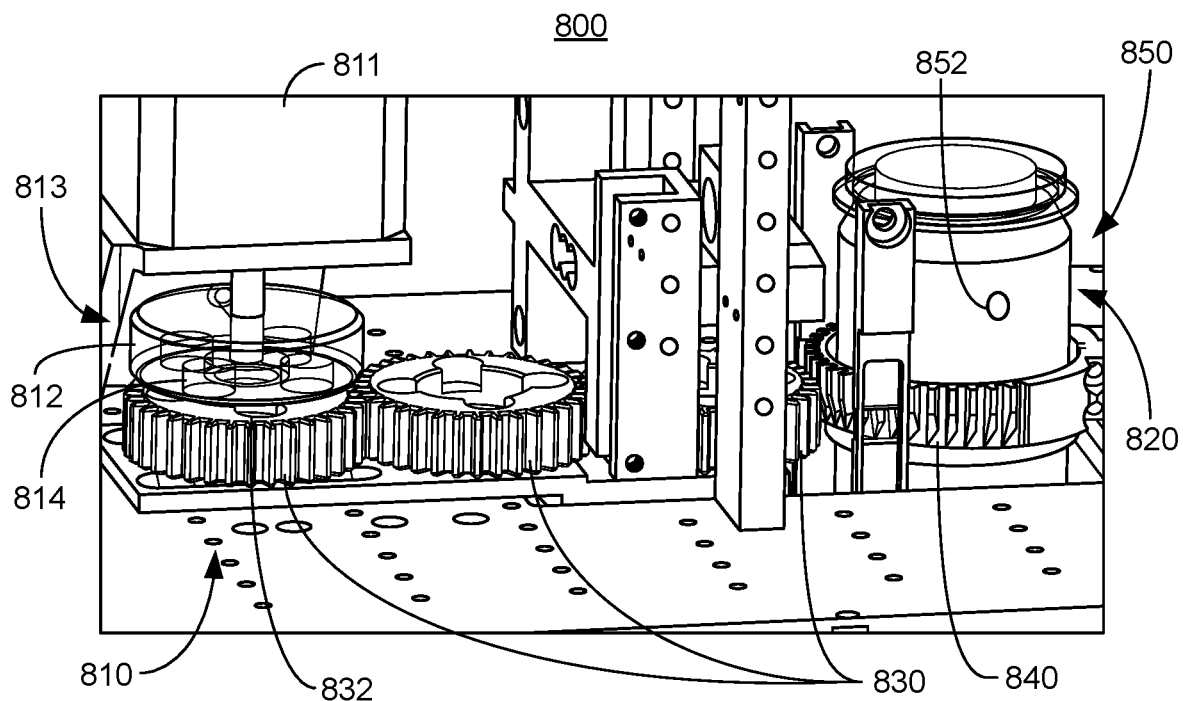
Figure 8C:
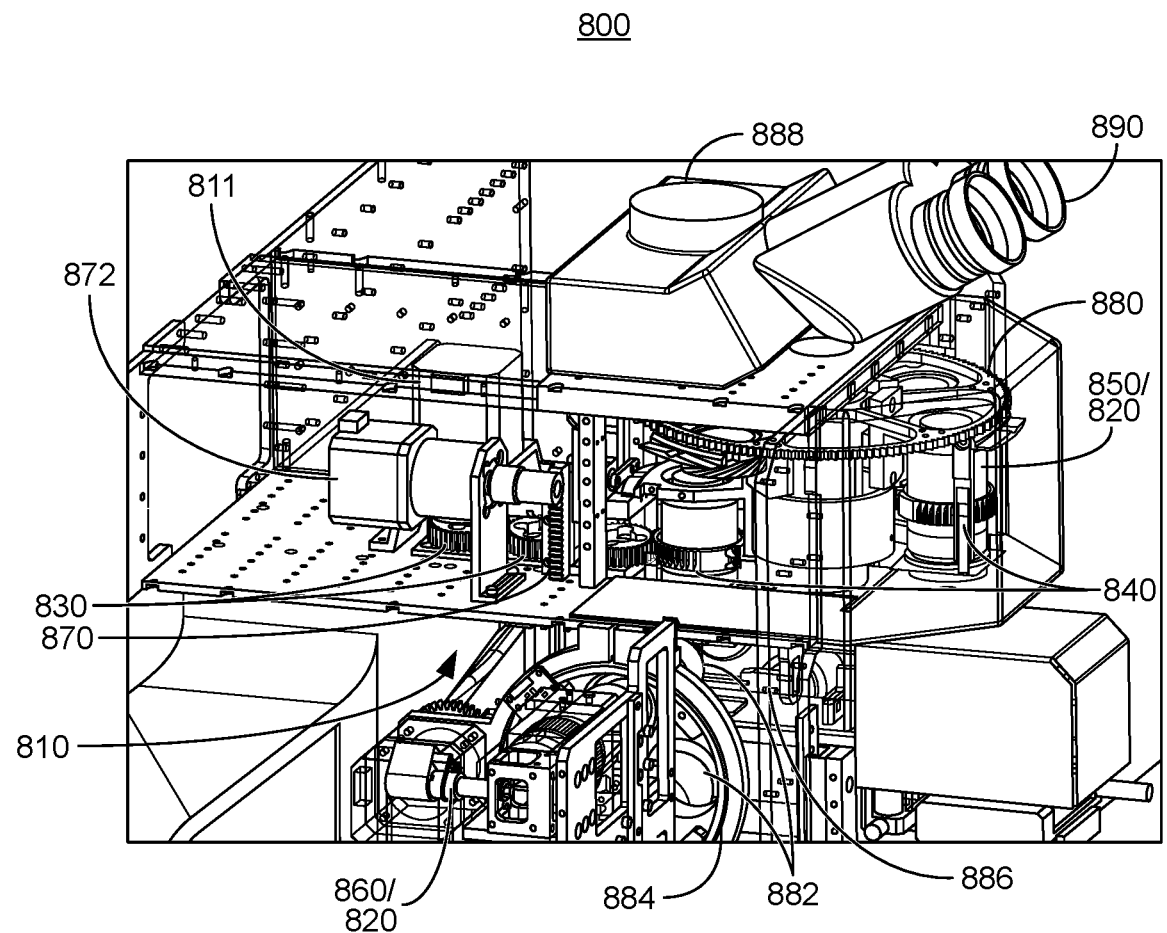

FIGS. 8A-8C are diagrams depicting various views of an embodiment of spherical aberration correction system 800 used in connection with a light sheet microscope (SPIM) in which system 800 is used. Thus, portions of the optical microscope analogous to optical microscope 110 and illumination systems analogous to illumination systems 102 and/or 104 are also shown. In particular, detection turret 880 having multiple detection objectives 850 (of which only one is labeled), deflector 860, toothed vertical slider 870, objective vertical slider motor 872, illumination turret 884 including illumination objectives 882, microscopy sample holder 886, video port 888 (to which a video camera is generally coupled), and oculars 890 are shown. For example, detection objectives 850, deflector 860, and illumination objectives 882 are analogous to detection objectives 206 and 622, deflection component 312, and illumination objective 316, respectively. Toothed vertical slider 870 and vertical slider motor 872 may be utilized to move detection objectives 850 vertically (i.e. parallel to the detection path). Video port 888 may be coupled to a video or other digital camera such as digital camera 604. For simplicity, a control system analogous to control system 160 is not shown.

Spherical aberration correction system 800 includes correction subsystem 810 and compensation subsystem 820. Correction subsystem 810 includes collar rotation motor 811, limiter 813, cog wheels 830, and correction collars 840. Collar rotation motor 811 may be activated to rotate cog wheels 830, which are coupled with and rotate correction collar 840. Limiter 812 limits the range through which correction collar 840 may be rotated. In some embodiments, limiter 812 does so by limiting the force applied to correction collar 840. In the embodiment shown, limited 813 includes case 812 and magnets 814. Magnets 814 may be permanent magnets that are magnetically coupled to magnets 832 in the closest cogwheel 830. Thus, motor 811 is physically coupled to limiter 812 via its shaft, but only magnetically coupled with cog wheels 830. If the force applied by motor 811 is greater than the magnetic coupling between limiter 813 and cog wheels 830, cog wheels 830 do not turn. Instead, magnets 814 snap to the next position and the shaft of motor 811 turns. As a result, correction collar 840 may not be rotated around detection objective 850 beyond a predetermined range. In some embodiments, a counter which shuts off or decoupled motor 811 from cog wheels 830 may be used for limiter 813. In particular, the angle of rotation of correction collar 840 corresponds to particular count(s). Thus, motor 811 is prevented from rotating correction collar 840 beyond the particular count(s) or, therefore, outside of the ends of the desired angular range for correction collar 840. Some combination of a magnetic system, a counter, and/or other analogous techniques may be used to preclude over-rotations of correction collar 840. As a result, the distance through which the lens in detection objective 850 may be translated can be limited to the desired range. Also shown is lens stabilizer 852. Lens stabilizer 852 may be utilized to prevent or mitigate rotation of the lens (not shown) within objective 840. In some embodiments lens stabilizer 852 includes one or more set screws for one or more physical lenses.

Compensation subsystem 820 may include deflector 860 and/or an electrically tunable lens that resides in the detection path of the optical microscope and may be analogous to electrically tunable lens 610. In some embodiments, the electrically tunable lenses are within detection objectives 850. In some embodiments, the electrically tunable lenses are located elsewhere in the detection path. Consequently, the labels for compensation subsystem 820 are depicted near detection objective 850 and deflector 860.

In operation, correction subsystem 810 and compensation subsystem 820 may be calibrated. For example, at a selected set of depths $z_0 \ldots z_i \ldots z_{N-1}$ inside the microscopy sample in sample holder 886, a series of images can be acquired by varying both the angle of rotation of correction collar 840 (θ) using rotation motor 821 and the focal shift f by focal shift enabling deflector 860 and/or the electrically tunable lens in the optical detection path of the microscope. The selection of the number and position of the depths can be performed both automatically (e.g. the depths at which the image has a total intensity higher than a certain threshold) or manually by operator. For example, the height of the microscopy sample in sample holder 886 may be set using a stepper stage analogous to stepper stage 106.

At each height, the rotation of correction collar 840 is set and the corresponding focal shift determined and implemented. At each $z_i \in [z_o; z_{N-1}]$, the optimum correction collar angle $W(z_i)$ and the focal shift $F(z_i)$ are determined by obtaining the correction collar rotation angle and the focal shift that maximize the contrast $R(z)$ of the image acquired at the depth $z=z_i$:

$$\{W(z), F(z)\} = \underset{\theta, f}{\mathrm{argmax}} R(z).$$

Typically, both the optimum focal shift and the correction collar rotation angle vary linearly as the depth z is varied. Therefore, a few (two at least, i.e. N=2) measurements of optimum correction collar angles and focal shifts are used. These measurements can be obtained during the sample scanning prior to obtaining a detailed 3D view of the sample. The sample scanning along the z-axis (depth) direction is carried out by using the motorized stepper stage to which sample holder 886 is attached (e.g. stepper stage 106). Thus, system 800 may be calibrated.

During use of system 800, the correction collar rotation angles $W(z)$ and focal shifts $F(z)$ at arbitrary depths z within the vertical scanning range are obtained by interpolating between tabulated N values of $W(z_i)$ and $F(z_i)$, $z_i \in [z_o; z_{N-1}]$. As a result, for each depth of scan z, there may be two additional values stored in the memory of the computer: the correction collar rotation angle and the focus shift.

Using system 800 allows for both spherical aberration correction and focus shift compensation to be provided. Further, because a control system analogous to control system 160 applies these corrections, the speed and/or accuracy of the correction and compensation may be improved. In addition, system 800 may correct for spherical aberrations and focus shift in multiple images captured by SPIM 100. Thus, performance of SPIM 100 may be improved.

Further, collar rotation motor 811 and cog wheels 830 are separatable from individual correction collars 840 on individual detection objectives 850. As a result, system 800 allows for spherical aberration correction in a light sheet microscope having several detection objectives 850 of varying magnifications, each of which is equipped with a correction collar 840. Detection objectives 850 can be put in contact with the imaging solution with the only objective vertical slider motor 872 that has a cog wheel attached to its axis. The cog wheel lowers toothed vertical slider 870 that is in turn put in contact with the correction collar-equipped detection objective 850. When the rotatable detection objective turret 880 puts the objective to face toothed vertical slider 870, vertical slider motor 872 allows the detection objective 850 in use to dip into the imaging solution in the sample chamber by an automatically or manually controlled depth along the vertical z-axis. Thus, detection objectives 850 and their rotation collars 840 may be individually controlled.

Figure 9:
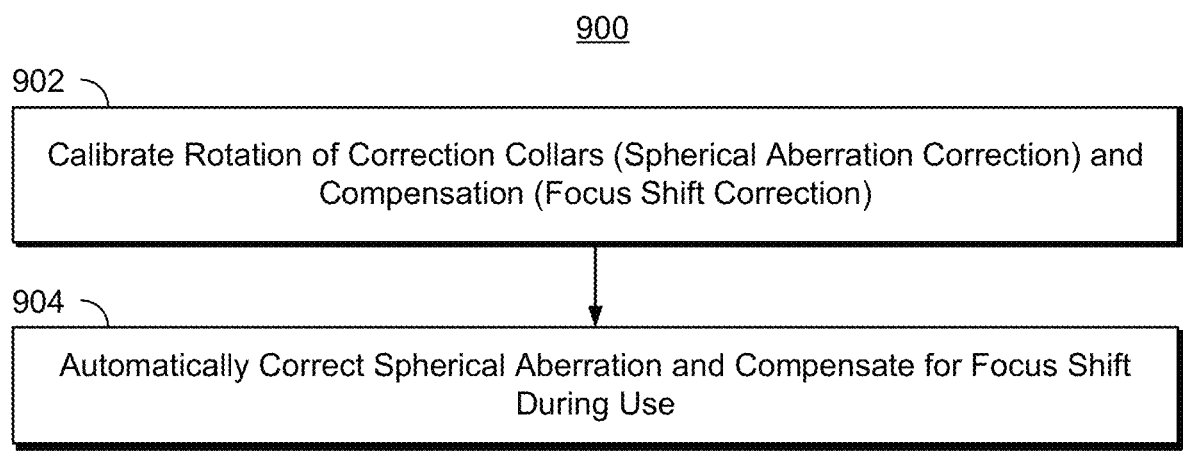
FIG. 9 is a flow-chart depicting an embodiment of a method for calibrating and automatically correcting for spherical aberration and focus shifts in a light sheet microscope system.

FIG. 9 is a flow-chart depicting an embodiment of method 900 for calibrating and automatically correcting for spherical aberration and focus shifts in light sheet microscope system, such as a SPIM. Method 900 may include other and/or additional steps or substeps. Further, some steps and/or substeps may occur in another order, including in parallel. Method 900 is discussed in the context of systems 100, 700, and 800. However, other systems may be used in some embodiments.

A correction subsystem and a compensation subsystem of a spherical aberration correction system are calibrated, at 904. In some embodiments, 904 includes determining the spherical aberration correction at each of a number of positions of the microscopy sample. The spherical aberration correction may include determining the rotation of a correction collar for the position. The compensation determines the focus shift due to the spherical aberration correction. This focus shift is compensated for by adjusting the position of the waist of the light sheet in relation to the focal plane of the detection objective. In some embodiments, the focal plane is shifted by changing the focal length of an electrically tunable lens in the detection path. In some embodiments, the position of the waist of the light sheet is shifted to coincide with the focal point. In some embodiments, some combination of a shift in the focal length and a change in the location of the waist of the light sheet is used. The parameters corresponding to the spherical aberration correction and compensation (focal length and/or light sheet was location) are stored. The determination of the spherical aberration correction and compensation are determined for each objective for multiple heights at 904.

The correction and compensation are automatically applied during use, at 904. Thus, the spherical aberration correction and adjustment of the position of the waist of the light sheet relative to the focal point of the objective are determined and applied at 904. In some embodiments, 904 includes interpolating based on the positions (i.e. heights), corrections, and compensations determined and stored as part of calibration in 902.

For example, using system 800, a particular detection objective 850 is used to image a microscopy sample held in microscope holder 886. Rotation collar 840 is rotated to correct a spherical aberration using correction subsystem 810. Deflector 860 and/or an electrically tunable lens (not explicitly shown in FIGS. 8A-8C) are used by compensation system 820 to correct for the focus shift induced by the spherical aberration correction. This is carried out as part of 902. Analogous processes are performed at other height(s) of the microscopy sample. The process may be repeated for remaining detection objectives 850. Thus, 902 calibrate system 800. This information may be stored, for example, in a control system analogous to control system 160.

During use, the spherical aberration and compensation are applied, at 904. For example, the control system interpolates between calibration values based on the height of the sample (e.g. the height of sample holder 886). Motor 811 is driven to rotate correction collar 840 through the appropriate amount. Limiter 813 may prevent over rotation of correction collar 840. Deflector 860 and/or an electrically tunable lens are controlled (e.g. via a control system analogous to control system 160) to apply the appropriate compensation. Images of the microscopy specimen may then be captured. This process is repeated for each height of the microscopy specimen desired to be imaged. Thus, spherical aberration may automatically be corrected and the focus shift automatically compensated for.

Thus, using method 900, both spherical aberration correction and focus shift compensation may be automatically provided during operation of a light sheet microscope. The speed and/or accuracy of the correction and compensation may be improved. Thus, imaging of microscopy specimens in SPIM 100 may be improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a correction subsystem, coupled with a detection objective of an optical microscope of a light sheet microscope, the light sheet microscope including an illumination source, optical elements, and the detection objective in an optical detection path of the optical microscope, the illumination source being configured to emit a light that travels along an illumination path to illuminate a microscopy specimen placed in the optical detection path of the optical microscope, the optical elements being in the illumination path and being configured to at least in part transform the light from the illumination source into a light sheet illuminating the microscopy specimen, the light sheet being movable through at least a portion of the microscopy specimen, the correction subsystem being configured to provide a correction of a spherical aberration using the detection objective; and
   a compensation subsystem, coupled with the correction subsystem, configured to adjust a position of a waist of the light sheet based on the correction.

2. The system of claim 1, wherein the detection objective includes a lens and a holder and wherein the correction subsystem further includes:
   a rotatable correction collar coupled with the detection objective and configured to translate the lens within the holder;
   a motor for driving rotation of the rotatable correction collar; and
   a limiter coupling the motor with the rotatable correction collar, the limiter configured to constrain rotation of the rotatable correction collar to within a particular range.

3. The system of claim 2, wherein the limiter further includes:
   a magnetic clutch coupling the motor with the rotatable correction collar.

4. The system of claim 1, wherein the correction corresponds to a focus shift in the optical detection path and wherein the compensation subsystem further includes:
   an electronically tunable lens within the optical detection path, a focal length of the electronically tunable lens being set based on the focus shift.

5. The system of claim 1, wherein the correction corresponds to a focus shift in the optical detection path and wherein the compensation subsystem further includes:
   a deflector within the illumination path configured to move the position of the waist of the light sheet along a detection path axis based on the focus shift.

6. The system of claim 1, wherein the correction corresponds to a focus shift in the optical detection path and wherein the compensation subsystem further includes:
   an electronically tunable lens within the optical detection path; and
   a deflector within the illumination path configured to move the position of the waist of the light sheet along a detection path axis;
   wherein a focal length of the electronically tunable lens and the position of the waist of the light sheet are set based on the focus shift.

7. The system of claim 1, wherein the detection objective is one of a plurality of detection objectives configured to be positionable in the optical detection path, wherein the correction subsystem further includes:
   a plurality of correction collars, each of the plurality of correction collars being coupled with one of the plurality of detection objectives, each of the plurality of correction collars configured to provide a corresponding spherical aberration correction for each of the plurality of detection objectives; and
   wherein the compensation subsystem is configured to adjust the position of the waist of the light sheet based on the corresponding spherical aberration correction.

8. A system for illuminating a microscopy specimen, comprising:
   an illumination source configured to emit a light that travels along an illumination path to illuminate the microscopy specimen placed in an optical detection path of an optical microscope;
   optical elements in the illumination path and configured to at least in part transform the light from the illumination source into a light sheet illuminating the microscopy specimen, the light sheet being movable through at least a portion of the microscopy specimen;
   a detection objective in the optical detection path; and
   a correction subsystem, coupled with the detection objective, configured to provide a correction of a spherical aberration using the detection objective; and
   a compensation subsystem, coupled with the correction subsystem, configured to adjust a position of a waist of the light sheet based on the correction.

9. The system of claim 8, wherein the detection objective includes a lens and a holder and wherein the correction subsystem further includes:
   a rotatable correction collar coupled with the detection objective and configured to translate the lens within the holder;
   a motor for driving rotation of the rotatable correction collar; and
   a limiter coupling the motor with the rotatable correction collar, the limiter configured to constrain rotation of the rotatable correction collar to within a particular range.

10. The system of claim 9, wherein the limiter further includes:
    a magnetic clutch coupling the motor with the rotatable correction collar.

11. The system of claim 8, wherein the correction corresponds to a focus shift in the optical detection path and wherein the compensation subsystem further includes:

an electronically tunable lens within the optical detection path, a focal length of the electronically tunable lens being set based on the focus shift.

12. The system of claim 8, wherein the correction corresponds to a focus shift in the optical detection path and wherein the compensation subsystem further includes:
   a deflector within the illumination path configured to move the position of the waist of the light sheet along a detection path axis based on the focus shift.

13. The system of claim 8, wherein the correction corresponds to a focus shift in the optical detection path and wherein the compensation subsystem further includes:
   an electronically tunable lens within the optical detection path; and
   a deflector within the illumination path configured to move the position of the waist of the light sheet along a detection path axis;
   wherein a focal length of the electronically tunable lens and the position of the waist of the light sheet are set based on the focus shift.

14. The system of claim 8, wherein the detection objective is one of a plurality of detection objectives configured to be positionable in the optical detection path, wherein the correction subsystem further includes:
   a plurality of correction collars, each of the plurality of correction collars being coupled with one of the plurality of detection objectives, each of the plurality of correction collars configured to provide a corresponding spherical aberration correction for each of the plurality of detection objectives; and
   wherein the compensation subsystem is configured to adjust the position of the waist of the light sheet based on the corresponding spherical aberration correction.

15. A method, comprising:
   calibrating a correction subsystem and a compensation subsystem, the correction subsystem being coupled with a detection objective of an optical microscope of a light sheet microscope, the light sheet microscope including an illumination source, optical elements, and the detection objective in an optical detection path of the optical microscope, the illumination source being configured to emit a light that travels along an illumination path to illuminate a microscopy specimen placed in the optical detection path of the optical microscope, the optical elements being in the illumination path and being configured to at least in part transform the light from the illumination source into a light sheet illuminating the microscopy specimen, the light sheet being movable through at least a portion of the microscopy specimen, the correction subsystem being configured to provide a correction of a spherical aberration using the detection objective, the compensation subsystem being coupled with the correction subsystem and configured to adjust a position of a waist of the light sheet based on the correction; and
   automatically applying the correction and adjusting the position of the waist of the light sheet based on the correction.

16. The method of claim 15, wherein the calibrating further includes:
   using a motorized stage to translate the microscopy specimen to a plurality of locations perpendicular to the light sheet;
   determining the correction for each of the plurality of locations; and
   determining an adjustment to the position of the waist of the light sheet for each of the plurality of locations.

17. The method of claim 16, wherein the automatically applying further includes:
   interpolating the correction and the adjustment for an additional location different from each of the plurality of locations to provide a final correction and a final adjustment.

18. The method of claim 15, wherein the correction corresponds to a focus shift in the optical detection path and wherein the compensation subsystem further includes at least one of an electronically tunable lens within the optical detection path and a deflector within the illumination path, the deflector being configured to move the position of the waist of the light sheet along a detection path axis based on the focus shift, the electronically tunable lens having a focal length set based on the focus shift.

19. The method of claim 15, wherein the detection objective includes a lens and a holder and wherein the correction subsystem further includes a rotatable correction collar, a motor, and a limiter, the rotatable correction collar being coupled with the detection objective and configured to translate the lens within the holder, the motor for driving rotation of the rotatable correction collar, the limiter coupling the motor with the rotatable correction collar, the automatically applying the correction further includes:
   the limiter constraining a rotation of the rotatable correction collar to within a particular range.

\* \* \* \* \*